US008683787B2

(12) United States Patent
Nakagawa et al.

(10) Patent No.: US 8,683,787 B2
(45) Date of Patent: Apr. 1, 2014

(54) EXHAUST GAS PURIFYING CATALYST AND METHOD FOR MANUFACTURING THE SAME

(75) Inventors: Takamasa Nakagawa, Yokohama (JP); Masanori Nakamura, Yokosuka (JP); Misaki Fujimoto, Yokosuka (JP); Naoki Kachi, Kawasaki (JP)

(73) Assignee: Nissan Motor Co., Ltd., Yokohama-shi (JP)

(*) Notice: Subject to any disclaimer, the term of this patent is extended or adjusted under 35 U.S.C. 154(b) by 239 days.

(21) Appl. No.: 13/387,475

(22) PCT Filed: Nov. 15, 2010

(86) PCT No.: PCT/JP2010/070265
§ 371 (c)(1),
(2), (4) Date: Feb. 14, 2012

(87) PCT Pub. No.: WO2011/062129
PCT Pub. Date: May 26, 2011

(65) Prior Publication Data
US 2012/0131911 A1 May 31, 2012

(30) Foreign Application Priority Data

Nov. 17, 2009 (JP) ................ P2009-261858

(51) Int. Cl.
F01N 3/10 (2006.01)
B01D 50/00 (2006.01)
B01J 21/00 (2006.01)
B01J 23/00 (2006.01)
B01J 20/00 (2006.01)

(52) U.S. Cl.
USPC ............ 60/299; 502/258; 502/259; 502/260; 502/261; 502/262; 502/263; 502/300; 502/302; 502/303; 502/304; 502/327; 502/328; 502/329; 502/330; 502/331; 502/332; 502/333; 502/334; 502/335; 502/336; 502/337; 502/338; 502/339; 502/349; 502/355; 502/415; 502/439; 422/170

(58) Field of Classification Search
USPC ......... 502/258–263, 300, 302–304, 327–339, 502/349, 355, 415, 439; 422/170; 60/299
See application file for complete search history.

(56) References Cited

U.S. PATENT DOCUMENTS

| 5,948,377 A | 9/1999 | Sung |
| 6,025,297 A | 2/2000 | Ogura et al. |

(Continued)

FOREIGN PATENT DOCUMENTS

| CN | 101219380 A | 7/2008 |
| CN | 101400441 A | 4/2009 |

(Continued)

OTHER PUBLICATIONS

USPTO Notice of Allowance, 13/056,438, Sep. 16, 2013, 10 pages.

(Continued)

Primary Examiner — Cam N. Nguyen
(74) Attorney, Agent, or Firm — Foley & Lardner LLP

(57) ABSTRACT

An exhaust gas purifying catalyst (1) of the present invention includes anchor/promoter simultaneous enclosure particles (5) including catalyst units (13) which contain: noble metal particles (8); and anchor particles (9) as an anchor material of the noble metal particles (8) supporting the noble metal particles (8); promoter units (14) which are provided not in contact with the noble metal particles (8) and contain first promoter particles (11) having an oxygen storage and release capacity; and an enclosure material (12) which encloses both the catalyst units (13) and the promoter units (14), and separates the noble metal particles (8) and the anchor particles (9) in the catalyst units (13) from the first promoter particles (11) in the promoter units (14). The exhaust gas purifying catalyst (1) further includes second promoter particles (6) which have the oxygen storage and release capacity, and are not enclosed in the anchor/promoter simultaneous enclosure particles (5) by the enclosure material (12).

17 Claims, 7 Drawing Sheets

(56) References Cited

U.S. PATENT DOCUMENTS

| | | | |
|---|---|---|---|
| 6,107,239 | A | 8/2000 | Qin et al. |
| 6,458,741 | B1 | 10/2002 | Roark et al. |
| 6,528,029 | B1 | 3/2003 | Dettling et al. |
| 6,528,451 | B2 | 3/2003 | Brezny et al. |
| 6,808,687 | B1 | 10/2004 | Uenishi et al. |
| 7,022,644 | B2 | 4/2006 | Foong et al. |
| 7,220,702 | B2 | 5/2007 | Hara et al. |
| 7,229,947 | B2 | 6/2007 | Hara et al. |
| 7,297,654 | B2 | 11/2007 | Kimura et al. |
| 7,498,288 | B2 | 3/2009 | Matsueda et al. |
| 7,517,510 | B2 | 4/2009 | Chen et al. |
| 7,550,124 | B2 | 6/2009 | Chen et al. |
| 7,563,744 | B2 | 7/2009 | Klein et al. |
| 7,585,811 | B2 | 9/2009 | Nakamura et al. |
| 7,601,670 | B2 | 10/2009 | Yasuda et al. |
| 7,605,108 | B2 | 10/2009 | Wakamatsu et al. |
| 7,674,744 | B2 | 3/2010 | Shiratori et al. |
| 7,713,908 | B2 | 5/2010 | Yamamoto et al. |
| 7,713,911 | B2 | 5/2010 | Wakamatsu et al. |
| 7,718,567 | B2 | 5/2010 | Hanaki et al. |
| 7,754,171 | B2 | 7/2010 | Chen et al. |
| 7,759,279 | B2 | 7/2010 | Shiratori et al. |
| 7,785,545 | B2 | 8/2010 | Miyoshi et al. |
| 7,799,298 | B2 | 9/2010 | Pfeifer et al. |
| 7,851,405 | B2 | 12/2010 | Wakamatsu et al. |
| 8,011,181 | B2 | 9/2011 | Hirata |
| 8,080,494 | B2 | 12/2011 | Yasuda et al. |
| 2004/0009106 | A1 | 1/2004 | Galligan et al. |
| 2005/0163677 | A1 | 7/2005 | Galligan et al. |
| 2005/0215429 | A1 | 9/2005 | Wakamatsu et al. |
| 2006/0019824 | A1 | 1/2006 | Miyoshi et al. |
| 2006/0217263 | A1 | 9/2006 | Kawamoto et al. |
| 2007/0025901 | A1 | 2/2007 | Nakatsuji et al. |
| 2007/0104623 | A1 | 5/2007 | Dettling et al. |
| 2007/0110650 | A1 | 5/2007 | Pfeifer et al. |
| 2007/0203021 | A1 | 8/2007 | Nakamura et al. |
| 2007/0238605 | A1 | 10/2007 | Strehlau et al. |
| 2008/0044330 | A1 | 2/2008 | Chen et al. |
| 2008/0139382 | A1 | 6/2008 | Morisaka et al. |
| 2008/0167181 | A1 | 7/2008 | Nakamura et al. |
| 2008/0233039 | A1 | 9/2008 | Hagemeyer et al. |
| 2009/0069174 | A1 | 3/2009 | Morikawa et al. |
| 2009/0088320 | A1 | 4/2009 | Kikuchi et al. |
| 2009/0111688 | A1 | 4/2009 | Nakamura et al. |
| 2009/0239739 | A1 | 9/2009 | Yasuda et al. |
| 2009/0275467 | A1 | 11/2009 | Shiratori et al. |
| 2009/0280978 | A1 | 11/2009 | Nakamura et al. |
| 2009/0318286 | A1 | 12/2009 | Nagata et al. |
| 2011/0034331 | A1 | 2/2011 | Kikuchi et al. |
| 2011/0177939 | A1 | 7/2011 | Nakamura et al. |
| 2012/0053050 | A1 | 3/2012 | Shiratori et al. |

FOREIGN PATENT DOCUMENTS

| | | | |
|---|---|---|---|
| DE | 60314 98 4 | T2 | 3/2008 |
| EP | 1 657 291 | A1 | 5/2006 |
| EP | 1 952 876 | A1 | 8/2008 |
| EP | 1 955 765 | A1 | 8/2008 |
| EP | 2 022 562 | A1 | 2/2009 |
| EP | 2 308 593 | A1 | 4/2011 |
| JP | 10-249198 | A | 9/1998 |
| JP | 2002-11350 | A | 1/2002 |
| JP | 2005-000829 | A | 1/2005 |
| JP | 2006-43541 | A | 2/2006 |
| JP | 2006-75716 | A | 3/2006 |
| JP | 2006-297372 | A | 11/2006 |
| JP | 2007-050382 | A | 3/2007 |
| JP | 2007 105632 | A | 4/2007 |
| JP | 2007-144290 | A | 6/2007 |
| JP | 2007-229653 | A | 9/2007 |
| JP | 2007-229654 | A | 9/2007 |
| JP | 2007-313493 | A | 12/2007 |
| JP | 2007-313498 | A | 12/2007 |
| JP | 2008-62156 | A | 3/2008 |
| JP | 2008-93496 | A | 4/2008 |
| JP | 2008-168192 | A | 7/2008 |
| JP | 2008-272745 | A | 11/2008 |
| RU | 2005538 | C1 | 1/1994 |
| RU | 2262983 | C2 | 10/2005 |
| RU | 2286209 | C2 | 10/2006 |
| RU | 2322296 | C1 | 4/2008 |
| WO | WO-2007/052627 | A1 | 5/2007 |
| WO | WO-2007/119658 | A1 | 10/2007 |
| WO | WO-02/072256 | A2 | 9/2012 |

OTHER PUBLICATIONS

Japanese Office Action, Sep. 24, 2013, 4 pages.
Japanese Office Action, Jul. 9, 2013, 5 pages.
USPTO, Office Action, U.S. Appl. No. 13/056,438, Sep. 28, 2012, 15 pages.
USPTO, Office Action, U.S. Appl. No. 13/254,313, Sep. 28, 2012, 15 pages.
USPTO Office Action, U.S. Appl. No. 13/056,438, Apr. 3, 2013, 9 pages.
USPTO Notice of Allowance, 13/254,313, Mar. 18, 2013, 10 pages.

DISTANCE BETWEEN CATALYST UNIT AND PROMOTER UNIT (nm)

(a)

(b)

WEIGHT RATIO OF FIRST PROMOTER PARTICLES TO TOTAL WEIGHT
OF FIRST AND SECOND PROMOTER PARTICLES

EXHAUST GAS PURIFYING CATALYST AND METHOD FOR MANUFACTURING THE SAME

TECHNICAL FIELD

The present invention relates to an exhaust gas purifying catalyst to purify exhaust gas emitted from an internal combustion engine, and a method for manufacturing the same. More specifically, the present invention relates to an exhaust gas purifying catalyst capable of purifying nitrogen oxide contained in exhaust gas with high efficiency, and a method for manufacturing the same.

BACKGROUND ART

A three-way catalyst is known as an exhaust gas purifying catalyst installed in a vehicle and the like to oxidize or reduce harmful gas (hydrocarbon (HC), carbon monoxide (CO), nitrogen oxide (NOx)) contained in exhaust gas. Due to the recent increase in consciousness of environmental issues, regulations on exhaust gas emitted from a vehicle and the like have been further tightened. In response to such regulations, advances are being made in the improvement of three-way catalysts.

For example, a conventionally disclosed three-way catalyst contains catalyst powder that contains: a catalytic active species enclosure material in which catalytic active species containing noble metal particles supported on a metal oxide are covered with a high heat resistant oxide; and a promoter enclosure material in which promoter component particles are covered with a high heat resistant oxide (for example, refer to Patent Literature 1). In the catalyst powder, since the promoter component particles are covered with the heat resistant oxide, an aggregation of the promoter component particles and a decrease in specific surface area are suppressed. Accordingly, high durability can be exerted.

CITATION LIST

Patent Literature

Patent Literature 1: Japanese Patent Unexamined Publication No. 2008-093496

SUMMARY OF INVENTION

In Patent Literature 1, when the inside of a honeycomb substrate is coated with the catalyst powder to form a catalyst layer, the fine pore diameter between the particles of the catalyst powder in the catalyst layer is much larger than the fine pore diameter of the high heat resistant oxide that covers the promoter particles. As a result, exhaust gas flowing into the catalyst layer from the inlet of the honeycomb substrate passes through the fine pores between the catalyst powders more easily than the fine pores of the high heat resistant oxide. Thus, in the case in which exhaust gas excessively contains oxygen, oxygen gets deeply into the catalyst layer before the promoter component covered with the high heat resistant oxide completely absorbs oxygen. Therefore, since oxygen is excessively present around the catalyst powder in the deep portion of the catalyst layer, there are cases in which a nitrogen oxide is not easily reduced. In addition, in the case in which an air-fuel ratio (A/F) of exhaust gas varies, the variation of the air-fuel ratio cannot be completely suppressed in the upper portion of the catalyst layer. As a result, there are cases in which a purifying efficiency of exhaust gas is decreased.

The present invention has been made in view of such conventional problems. It is an object of the present invention to provide an exhaust gas purifying catalyst capable of purifying a nitrogen oxide with high efficiency even when oxygen is excessively present, for example, even when the supply of fuel to an internal combustion engine is stopped and only air is emitted. It is another object of the present invention to provide a method for manufacturing the above-described exhaust gas purifying catalyst by a simple method.

An exhaust gas purifying catalyst according to the first aspect of the present invention includes: anchor/promoter simultaneous enclosure particles including: catalyst units which contain: noble metal particles; and anchor particles as an anchor material of the noble metal particles supporting the noble metal particles: promoter units which are provided not in contact with the noble metal particles, and contain first promoter particles having an oxygen storage and release capacity; and an enclosure material which encloses both the catalyst units and the promoter units, and separates the noble metal particles and the anchor particles in the catalyst units from the first promoter particles in the promoter units. The exhaust gas purifying catalyst further includes second promoter particles which have the oxygen storage and release capacity, and are not enclosed in the anchor/promoter simultaneous enclosure particles by the enclosure material.

An exhaust gas purifying catalyst according to the second aspect of the present invention includes: anchor/promoter simultaneous enclosure particles including: catalyst units which contain: noble metal particles; and anchor particles as an anchor material of the noble metal particles supporting the noble metal particles; promoter units which are provided not in contact with the noble metal particles, and contain first promoter particles having an oxygen storage and release capacity; and an enclosure material which encloses both the catalyst units and the promoter units, and separates the noble metal particles and the anchor particles in the catalyst units from the first promoter particles in the promoter units. The exhaust gas purifying catalyst further includes second promoter particles which have an oxygen storage and release capacity, and are not enclosed in the anchor/promoter simultaneous enclosure particles by the enclosure material. The second promoter particles are provided in fine pores formed between a plurality of the anchor/promoter simultaneous enclosure particles.

A method for manufacturing the exhaust gas purifying catalyst according to the third aspect of the present invention includes: pulverizing composite particles of the noble metal particles and the anchor particles and the first promoter particles individually or concurrently; and preparing the anchor/promoter simultaneous enclosure particles by mixing the pulverized composite particles and the pulverized first promoter particles with slurry containing a precursor of the enclosure material, followed by drying. The method for manufacturing the catalyst further includes mixing the anchor/promoter simultaneous enclosure particles with the second promoter particles, followed by pulverizing.

BRIEF DESCRIPTION OF DRAWINGS

FIG. 1(a) is a perspective view showing an exhaust gas purifying catalyst, FIG. 1(b) is a partially enlarged schematic view in a portion indicated by a reference number B in FIG.

1(a), FIG. 1(c) is a partially enlarged schematic view in a portion indicated by a reference number C in FIG. 1(b), and FIG. 1(d) is a partially enlarged schematic view in a portion indicated by a reference number D in FIG. 1(c).

DESCRIPTION OF EMBODIMENTS

Figure 1:
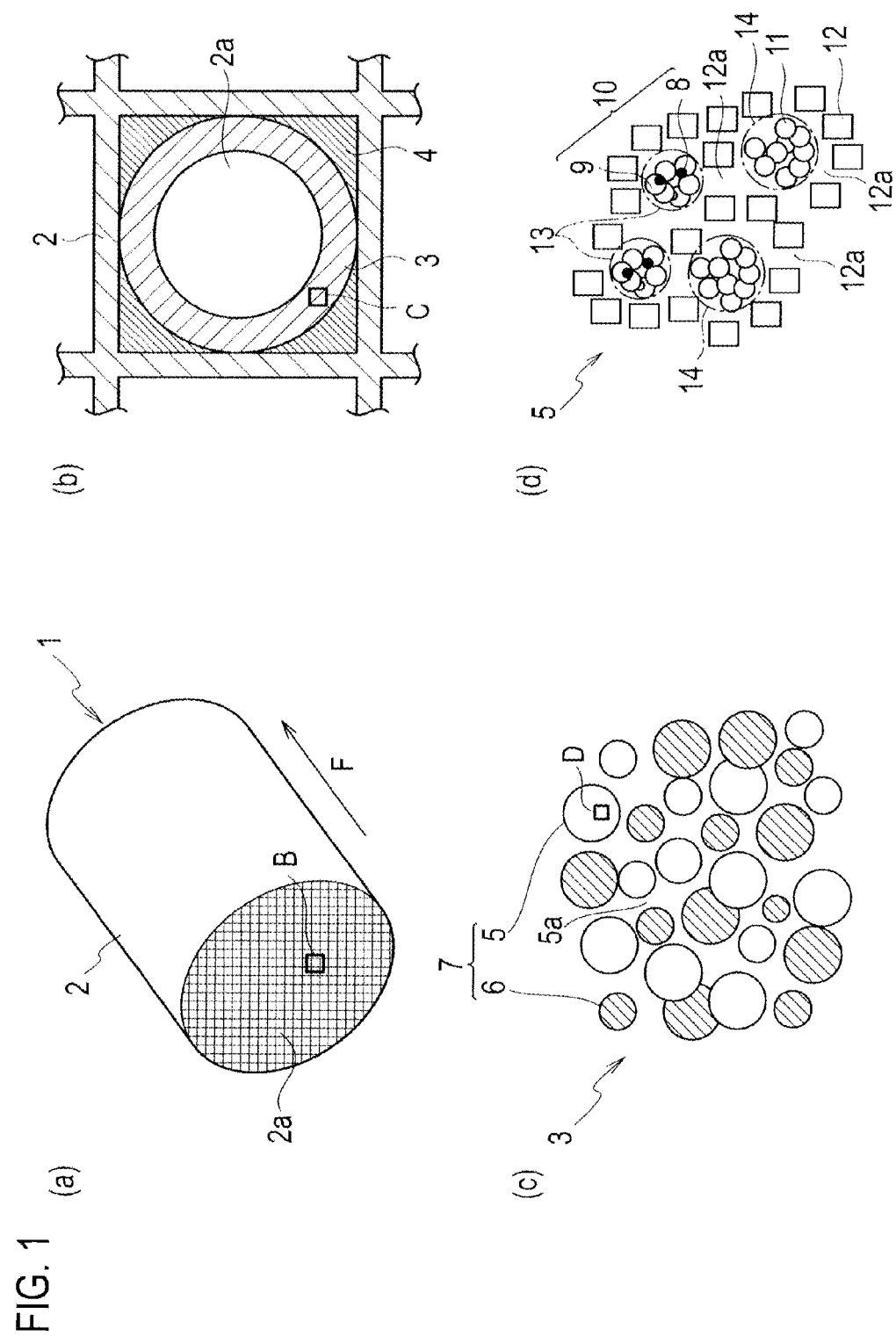
FIG. 1 is a schematic view showing an exhaust gas purifying catalyst according to an embodiment of the present invention.

A description will be made below in detail of an embodiment of the present invention with reference to the drawings. Note that, in the drawings described below, components having the same functions are indicated by the same reference numbers, and the explanations thereof will not be repeated.

[Exhaust Gas Purifying Catalyst]

FIG. 1 shows an exhaust gas purifying catalyst (hereinafter, also referred to as a catalyst) 1 according to the embodiment of the present invention. As shown in FIG. 1(a), the exhaust gas purifying catalyst 1 includes a honeycomb substrate (a fire-resistant inorganic substrate) 2 having a plurality of cells 2a. Exhaust gas passes through the respective cells 2a in an exhaust gas flow direction F, and comes into contact with a catalyst layer. Thus, the exhaust gas is purified.

The exhaust gas purifying catalyst 1 includes the catalyst layer formed on the inner surface of the substrate 2. More specifically, as shown in FIG. 1(b), a catalyst layer 3 and an undercoat layer 4 are formed on the inner surface of the substrate 2. As shown in FIG. 1(c), the catalyst layer 3 contains catalyst powder 7 containing plural anchor/promoter simultaneous enclosure particles 5 and plural second promoter particles 6. The following is a specific explanation of the anchor/promoter simultaneous enclosure particles 5 and the second promoter particles 6.

[Anchor/Promoter Simultaneous Enclosure Particles]

The anchor/promoter simultaneous enclosure particles 5 (hereinafter, also referred to as simultaneous enclosure particles 5) contain noble metal particles 8, anchor particles 9 and first promoter particles 11 as shown in FIG. 1(d). The noble metal particles 8 are supported on the surfaces of the anchor particles 9 as an anchor material of the noble metal particles 8. The first promoter particles 11 are provided not in contact with the noble metal particles 8, and have an oxygen storage and release capacity. The simultaneous enclosure particles 5 contain an enclosure material 12 that encloses both composite particles 10 of the noble metal particles 8 and the anchor particles 9 and the first promoter particles 11, and separates the composite particles 10 from the first promoter particles 11.

In the simultaneous enclosure particles 5, the noble metal particles 8 are supported on and in contact with the anchor particles 9. The anchor particles 9 function as a chemically bonding anchor material so as to prevent the movement of the noble metal particles 8. In addition, the anchor particles 9 on which the noble metal particles 8 are supported are covered and enclosed with the enclosure material 12, so that the movement of the noble metal particles 8 enclosed in sections partitioned by the enclosure material 12 beyond the respective sections is physically suppressed. Furthermore, since the anchor particles 9 are enclosed in the sections partitioned by the enclosure material 12, a mutual contact and aggregation of the respective anchor particles 9 beyond the sections partitioned by the enclosure material 12 are prevented. Accordingly, not only the aggregation of the anchor particles 9 but also the aggregation of the noble metal particles 8 supported on anchor particles 9 can be prevented. As a result, the simultaneous enclosure particles 5 can suppress a decrease in catalytic activity caused by the aggregation of the noble metal particles 8 without an increase in manufacturing cost and environmental load. Moreover, the improvement of activity of the noble metal particles 8 due to the anchor particles 9 can be maintained.

In addition, in the simultaneous enclosure particles 5, the first promoter particles 11 having an oxygen storage and release capacity are covered and enclosed with the enclosure material 12 so as to further prevent the physical movement of the first promoter particles 11. Since the first promoter particles 11 are enclosed in the sections partitioned by the enclosure material 12, a mutual contact and aggregation of the first promoter particles 11 beyond the respective sections partitioned by the enclosure material 12 are prevented. As a result, a decrease in specific surface area can be prevented.

The anchor/promoter simultaneous enclosure particles 5 shown in FIG. 1(d) include catalyst units 13 containing the noble metal particles 8 and secondary particles in which primary particles of the anchor particles 9 are aggregated, and promoter units 14 containing secondary particles in which primary particles of the first promoter particles 11 are aggregated, and the respective units are enclosed in the regions partitioned by the enclosure material 12. It is to be noted that the anchor particles 9 and the first promoter particles 11 may be provided as primary particles in the regions partitioned by the enclosure material 12. In other words, the catalyst units 13 may contain the noble metal particles 8 and the primary particles of the anchor particles 9, and the promoter units 14 may contain the primary particles of the first promoter particles 11. In addition, the catalyst units 13 may be composed of the noble metal particles 8 and the anchor particles 9, and the promoter units 14 may be composed of the first promoter particles 11.

As the noble metal particles 8, at least one element selected from the group consisting of platinum (Pt), palladium (Pd), rhodium (Rh), gold (Au), silver (Ag), iridium (Ir) and ruthenium (Ru) may be used. Among these, platinum (Pt), palladium (Pd) and rhodium (Rh) can particularly exert high NOx purification performance.

The anchor particles 9 may contain at least one compound selected from the group consisting of aluminum oxide ($Al_2O_3$), cerium oxide ($CeO_2$), zirconium oxide ($ZrO_2$), yttrium oxide ($Y_2O_3$) and neodymium oxide ($Nd_2O_3$) as a main component. Among these, the anchor particles 9 preferably contain $Al_2O_3$ or $ZrO_2$ as a main component since $Al_2O_3$ and $ZrO_2$ have excellent resistance to high temperature and can maintain a high specific surface area. Note that, in this specification, the main component is a component of which the content in the particles is 50 atom % or more.

The first promoter particles 11 preferably contain at least one of cerium (Ce) and praseodymium (Pr) that have an oxygen storage and release capacity. Particularly, the first promoter particles 11 preferably contain a compound having a high oxygen storage and release capacity as a main component such as cerium oxide ($CeO_2$) and praseodymium oxide ($Pr_6O_{11}$). Since both Ce and Pr constitute multivalent oxides in which an oxidation number varies because of atmospheric fluctuations of exhaust gas, Ce and Pr are elements that can store and release active oxygen.

The enclosure material 12 preferably contains at least one of aluminum (Al) and silicon (Si). The enclosure material 12 is preferably made of a material that can enclose the anchor particles and the first promoter particles, and also ensure gas permeability. With regard to such a material, a compound containing at least one of Al and Si, such as $Al_2O_3$ and $SiO_2$, has fine pores having a large volume, and can ensure a high gas diffusion property. Therefore, the enclosure material 12 preferably contains $Al_2O_3$ or $SiO_2$ as a main component. Alternatively, the enclosure material may be a composite compound of Al and Si.

It is to be noted that the enclosure material 12 used in the anchor/promoter simultaneous enclosure particles 5 does not completely cover the peripheries of the catalyst units 13 and the promoter units 14. In other words, the enclosure material 12 has fine pores having a size sufficient to allow exhaust gas and active oxygen to pass therethrough, while sufficiently covering the catalyst units 13 and the promoter units 14 to prevent the physical movement of the catalyst units 13 and the promoter units 14. More specifically, as shown in FIG. 1(d), the enclosure material 12 sufficiently encloses the catalyst units 13 and the promoter units 14, and prevents the aggregation of the particles of the respective units. In addition, the enclosure material 12 has a plurality of fine pores 12a, thereby allowing exhaust gas and active oxygen to pass through the fine pores 12a. A fine pore diameter of the fine pores 12a is preferably 30 nm or less, more preferably between 10 nm and 30 nm. The fine pore diameter may be obtained by a gas adsorption method.

As described above, alumina or silica may be used for the enclosure material 12. When the enclosure material contains alumina, it is preferable to use boehmite (AlOOH) as a precursor. That is, the anchor particles 9 supporting the noble metal particles 8 and the first promoter particles 11 are added to slurry obtained in such a manner that boehmite is dispersed in a solvent such as water, and then stirred. Thus, boehmite is adhered to the peripheries of the anchor particles 9 and the first promoter particles 11. Subsequently, the mixed slurry is dried and baked, so that boehmite is dehydrated and condensed at the peripheries of the anchor particles 9 and the first promoter particles 11. Accordingly, the enclosure material containing γ-alumina derived from boehmite is formed. The enclosure material thus obtained containing alumina derived from boehmite has excellent gas permeability while covering the anchor particles 9 and the first promoter particles 11, since the enclosure material has a large number of fine pores having a size of 30 nm or less.

Similarly, when the enclosure material contains silica, it is preferable to use silica sol and zeolite as a precursor. That is, the anchor particles 9 supporting the noble metal particles 8 and the first promoter particles 11 are added to slurry obtained in such a manner that silica sol and zeolite are dispersed in a solvent, and then stirred, followed by drying and baking. Accordingly, the enclosure material containing silica is formed. The enclosure material thus obtained containing silica derived from silica sol and zeolite also has excellent gas permeability while covering the anchor particles 9 and the first promoter particles 11, since the enclosure material has a large number of fine pores having a size of 30 nm or less.

An average particle diameter of the catalyst units 13 enclosed in the sections partitioned by the enclosure material 12 is preferably 300 nm or less. Thus, an average secondary particle diameter of the anchor particles 9 included in the catalyst units 13 is also preferably 300 nm or less. In such a case, when rhodium is used as noble metal, active oxygen can be supplied while a reduction state of rhodium is maintained. More preferably, the average particle diameter of the catalyst units 13 and the average secondary particle diameter of the anchor particles are 200 nm or less. Thus, an aggregation of the noble metal can be suppressed since the amount of the noble metal supported on the secondary particles of the anchor particles is further decreased. A lower limit of the average particle diameter of the catalyst units 13 and the average secondary particle diameter of the anchor particles 9 is not particularly limited. However, as described below, the average particle diameter of the catalyst units 13 is preferably larger than an average fine pore diameter of the fine pores 12a formed in the enclosure material 12. Therefore, the average particle diameter of the catalyst units 13 and the average secondary particle diameter of the anchor particles 9 are preferably larger than 30 nm.

An average particle diameter of the promoter units 14 included in the sections partitioned by the enclosure material 12 is preferably 1000 nm or less, more preferably 300 nm or less. Thus, an average secondary particle diameter of the first promoter particles 11 included in the promoter units 14 is also preferably 1000 nm or less, more preferably 300 nm or less. Due to such average particle diameters, the surface areas of the secondary particles are greatly increased, so that a supply rate of active oxygen is increased and catalytic performance is improved. A lower limit of the average particle diameter of the promoter units 14 and the average secondary particle diameter of the first promoter particles 11 is not particularly limited as in the case of the anchor particles 9. However, as described below, the average particle diameter of the promoter units 14 is preferably larger than the average fine pore diameter of the fine pores 12a formed in the enclosure material 12. Therefore, the average particle diameter of the promoter units 14 and the average secondary particle diameter of the first promoter particles 11 are preferably larger than 30 nm.

The respective average secondary particle diameters of the anchor particles and the first promoter particles may be obtained by analysis of slurry containing the respective particles during the preparation of the simultaneous enclosure particles using a laser diffraction particle size distribution analyzer. Note that, the average secondary particle diameter in this case is a median diameter (D50). Alternatively, the average secondary particle diameters of the respective particles and a particle diameter of the noble metal particles described below may be measured from TEM photographs of the prepared simultaneous enclosure particles. In addition, the respective average particle diameters of the catalyst units 13 and the promoter units 14 may also be measured from the TEM photographs.

The average particle diameter of the noble metal particles 8 is preferably 2 nm or more and 10 nm or less. When the average particle diameter of the noble metal particles 8 is 2 nm or more, sintering caused by the movement of the noble metal particles themselves can be suppressed. When the average particle diameter of the noble metal particles 8 is 10 nm or less, a decrease in reactivity with exhaust gas can be prevented.

With regard to the catalyst units 13 including the noble metal particles 8 and the anchor particles 9, an average particle diameter Da of the catalyst units 13 and an average fine pore diameter Db of the fine pores 12a formed in the enclosure material 12 enclosing the catalyst units 13 preferably satisfy a condition of Db<Da. As shown in FIG. 1(d), the condition of Db<Da means that the average particle diameter Da of the catalyst units 13 is larger than the average fine pore diameter Db of the fine pores 12a in the enclosure material 12. When the condition of Db<Da is satisfied, the composite particles 10 of the noble metal particles 8 and the anchor particles 9 are prevented from moving through the fine pores formed in the enclosure material 12. Accordingly, an aggregation of the respective composite particles 10 enclosed in the different sections can be suppressed.

Figure 2:
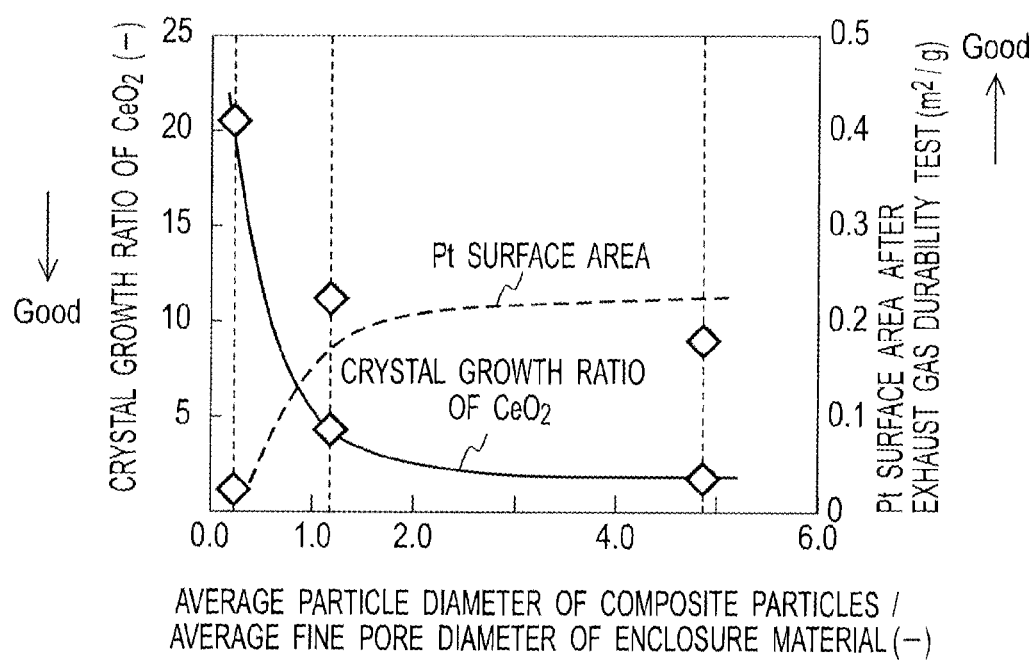
FIG. 2 is a graph showing a relationship between a ratio Da/Db of an average particle diameter Da of composite particles and an average fine pore diameter Db of an enclosure material before an exhaust gas durability test represented on a horizontal axis, and a crystal growth ratio of $CeO_2$ and a surface area of Pt after an exhaust gas durability test represented on a vertical axis.

The effect due to the inequality Db<Da has been confirmed by the experiment by the inventors. FIG. 2 is a graph showing a relationship between a ratio Da/Db of the average particle diameter Da of the composite particles 10 and the average fine pore diameter Db of the enclosure material before an exhaust gas durability test, and a crystal growth ratio of ceria ($CeO_2$) as the anchor particles 9 and a surface area of platinum (Pt) as the noble metal particles 8 after the exhaust gas durability test, in which the ratio Da/Db is represented on a horizontal axis, and the crystal growth ratio and the surface area are represented on a vertical axis. According to FIG. 2, it is understood that, when Da/Db is more than 1, the crystal growth ratio of $CeO_2$ is significantly decreased, and the degree of sintering of $CeO_2$ is low. It is also understood that the large surface area of Pt is maintained even after the durability test, and an aggregation of Pt is suppressed.

As in the case of the catalyst units 13, an average particle diameter Dc of the promoter units 14 and the average fine pore diameter Db of the fine pores 12a formed in the enclosure material 12 enclosing the promoter units 14 preferably satisfy a condition of Db<Dc. That is, as shown in FIG. 1(d), the condition of Db<Dc means that the average particle diameter Dc of the catalyst units 14 is larger than the average fine pore diameter Db of the fine pores 12a in the enclosure material 12. When the condition of Db<Dc is satisfied, the first promoter particles 11 are prevented from moving through the fine pores 12a formed in the enclosure material 12. Accordingly, an aggregation of the respective first promoter particles enclosed in the different sections can be suppressed. As a result, the large surface areas of the first promoter particles are maintained, and active oxygen can be adsorbed and released efficiently on the surfaces of the particles.

In addition, 80% or more of the noble metal particles 8 are preferably in contact with the anchor particles 9. When the ratio of the noble metal particles 8 in contact with the anchor particles 9 is less than 80%, sintering may be promoted because of the movement of the noble metal particles 8 since the noble metal particles 8 not present on the anchor particles 9 are increased.

At least one of the anchor particles and the first promoter particles is preferably an oxide further containing at least one element selected from the group consisting of iron (Fe), manganese (Mn), cobalt (Co) and nickel (Ni). Namely, as described above, the anchor particles 9 contain alumina or zirconia as a main component, and the first promoter particles 9 contain cerium oxide or praseodymium oxide as a main component. In addition, at least one of the anchor particles and the first promoter particles preferably contains transition metal described above as an additive. When at least one transition metal is contained in at least one of the anchor particles and the first promoter particles, a catalytic activity, especially a purification rate of CO and NO, can be improved due to active oxygen contained in the transition metal.

In addition, at least one of the anchor particles and the first promoter particles preferably further contains at least one NOx adsorbing material selected from the group consisting of barium (Ba), magnesium (Mg), calcium (Ca), strontium (Sr) and sodium (Na). A compound containing such an element functions as the NOx adsorbing material. Therefore, when at least one of the anchor particles and the first promoter particles contains the NOx adsorbing material, NOx purification performance is improved. This is because a NOx adsorbing reaction has high sensitivity to contact with gas. The catalyst containing such a NOx adsorbing material is preferably used as a catalyst for a lean burn engine in which a large amount of NOx is generated rather than an engine in which fuel combustion is carried out around a stoichiometric air-fuel ratio.

The enclosure material is preferably an oxide containing at least one element selected from the group consisting of cerium (Ce), zirconium (Zr), lanthanum (La), barium (Ba), magnesium (Mg), calcium (Ca), strontium (Sr) and sodium (Na). When the enclosure material contains cerium, the enclosure material can also have an oxygen storage and release capacity so that exhaust gas purification performance is improved. When the enclosure material contains zirconium and lanthanum, resistance to heat in the enclosure material is improved. In addition, when the enclosure material contains a NOx adsorbing material such as barium, magnesium, calcium, strontium and sodium, NOx purification performance is improved. Here, the above-mentioned elements may be contained in the enclosure material by the process of mixing nitrate or acetate of these elements into precursor slurry of the enclosure material.

In the anchor/promoter simultaneous enclosure particles 5, it is particularly preferable that the noble metal particles 8 are rhodium (Rh) and the anchor particles 9 are an oxide containing at least zirconium (Zr). Catalytic performance of Rh tends to be easily decreased in a high oxidation state. However, high oxidization and aggregation of Rh can be suppressed by a proper adjustment of the distances between the anchor particles and the first promoter particles.

The high oxidization of Rh may be observed according to binding energy analysis by use of an X-ray photoelectron spectroscopy (XPS). In general, it is known that 3d5 orbital binding energy of Rh is 307.2 eV in a metal state, and is approximately 310.2 eV in a high oxidation state. When an oxide such as $Al_2O_3$ and $ZrO_2$ is used as an anchor material, the 3d5 orbital binding energy of Rh is preferably 308.8 eV or less since a decrease in catalytic performance is caused when the 3d5 orbital binding energy is 308.8 eV or more. The 3d5 orbital binding energy of Rh may be adjusted to 308.8 eV or less by a proper adjustment of the distances between the anchor particles and the first promoter particles. At the time of measuring binding energy, a charge correction is generally carried out using a certain element, and the binding energy of the element with a large content is corrected with respect to a literature value. For example, hydrocarbon contained in oil mist or the like derived from a pump for maintaining an X-ray photoelectron spectrometer in a high vacuum state is used, and a C1s peak of this hydrocarbon is compared with a literature value, so as to carry out the correction.

As described above, when the noble metal particles 8 are rhodium, the anchor particles 9 are preferably an oxide containing zirconium as a main component. In the case in which the anchor particles 9 are an oxide containing alumina as a main component, rhodium and alumina form a solid solution, and rhodium is subjected to high oxidization. As a result, a catalytic activity may be decreased. On the other hand, in the case of an oxide containing Zr, more preferably in the case of an oxide containing 50% or more of Zr in the anchor particles 9 in terms of atom %, high oxidization and aggregation of Rh can be suppressed. Examples of such an oxide containing Zr as a main component include zirconia ($ZrO_2$), and lanthanum-added zirconia ($Zr$—$La$—$O_x$) and lanthanum-cerium-added zirconia ($Zr$—$La$—$Ce$—$O_x$).

It is preferable to contain the noble metal particles 8 by an amount of $8\times10^{-20}$ mol or less in total in each section partitioned by the enclosure material 12. That is, the amount by mole of the noble metal particles 8 in one catalyst unit 13 is preferably $8\times10^{-20}$ mol or less. In each section partitioned by the enclosure material 12, the several noble metal particles 8 may move to be aggregated under a high temperature condition. In such a case, the noble metal particles 8 do not move to reach the enclosure material 12 due to the effect of the anchor particles 9, but the noble metal particles 8 are formed into one or more aggregates on the surfaces of the anchor particles 9.

Figure 3:
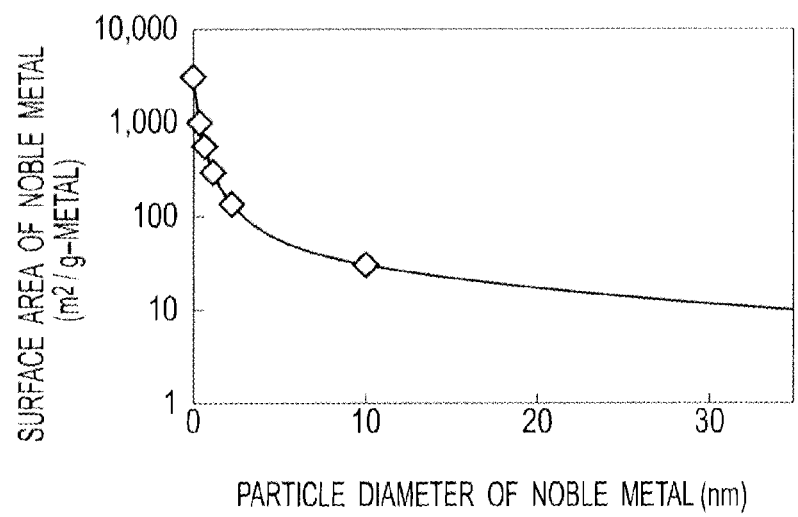
FIG. 3 is a graph showing a relationship between a particle diameter and a surface area of noble metal.

Here, in the case in which the noble metal particles 8 are aggregated in one catalyst unit 13, and a particle diameter of the aggregated noble metal particles 8 is 10 nm or less, the noble metal particles 8 exhibit a sufficient catalytic activity, thereby suppressing a deterioration of the catalytic activity caused by the aggregation thereof. FIG. 3 is a graph showing a relationship between a particle diameter and a surface area of each of platinum and palladium as noble metal. Note that, in FIG. 3, the relationship of each of platinum and palladium is shown as one curve since platinum and palladium have substantially the same relationship between the particle diameter and the surface area thereof. As is apparent from FIG. 3, when the particle diameter of the noble metal is 10 nm or less, then the particle surface area is large. Accordingly, a deterioration in catalytic activity because of aggregation can be suppressed.

Figure 4:
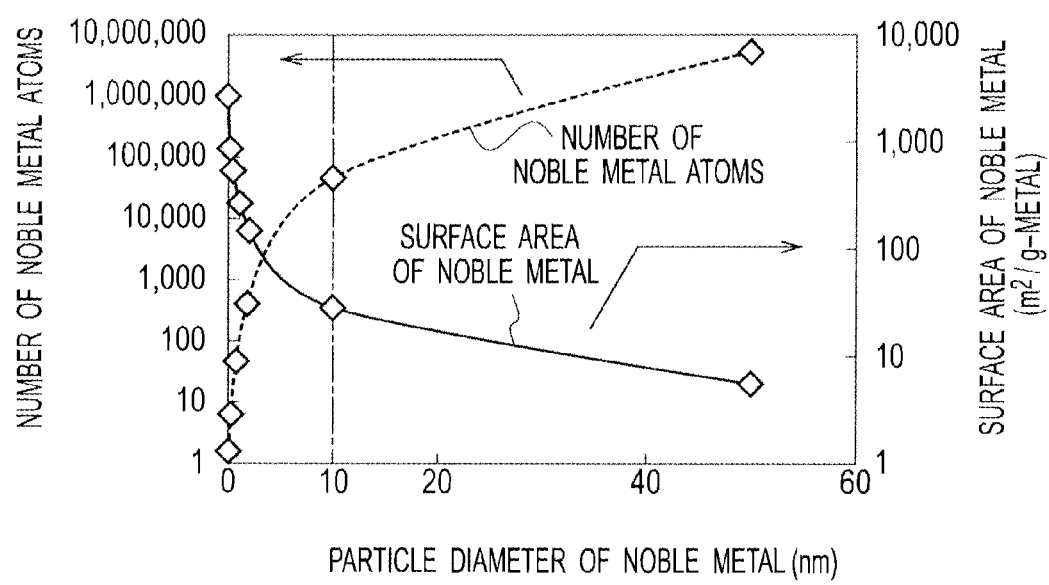
FIG. 4 is a graph showing a relationship between a particle diameter and a number of atoms and a surface area of noble metal.

FIG. 4 is a graph showing a relationship between the particle diameter and the number of atoms of each of platinum and palladium as noble metal. Note that, in FIG. 4, the relationship of each of platinum and palladium is shown as one curve since platinum and palladium have substantially the same relationship. As is apparent from FIG. 4, the number of atoms when the particle diameter of the noble metal is 10 nm is approximately 48000. When this value is converted into the number of moles, the number of moles quantitatively becomes approximately $8\times10^{-20}$ mol. In view of this, when the amount of the noble metal in one catalyst unit 13 is controlled and set to $8\times10^{-20}$ mol or less, a deterioration in catalytic activity can be prevented even if the noble metal is aggregated into one mass in one catalyst unit 13. One example of the method of setting the amount of the noble metal contained in one catalyst unit 13 to $8\times10^{-20}$ mol or less may be to decrease the diameter of the anchor particles 9 supporting the noble metal particles 8.

In the simultaneous enclosure particles 5 shown in FIG. 1(d), when adsorption stabilization energy of the noble metal particles 8 to the anchor particles 9 is defined as Ea, and adsorption stabilization energy of the noble metal particles 8 to the enclosure material 12 is defined as Eb, Ea preferably has a smaller value than Eb (Ea<Eb). When the adsorption stabilization energy Ea of the noble metal particles 8 to the anchor particles 9 is smaller than the adsorption stabilization energy Eb of the noble metal particles 8 to the enclosure material 12, the noble metal particles 8 can be prevented from moving to reach the enclosure material 12. As a result, the noble metal particles 8 can be further suppressed from being aggregated.

In addition, the difference (Eb−Ea) between the adsorption stabilization energy Ea of the noble metal particles 8 to the anchor particles 9 and the adsorption stabilization energy Eb of the noble metal particles 8 to the enclosure material 12 more preferably exceeds 10.0 cal/mol. When the difference between the respective adsorption stabilization energies exceeds 10.0 cal/mol, the noble metal particles 8 can be more surely prevented from moving to reach the enclosure material 12.

Note that, the adsorption stabilization energy Ea of the noble metal particles 8 to the anchor particles 9 and the adsorption stabilization energy Eb of the noble metal particles 8 to the enclosure material 12 may be calculated by simulations by use of a density functional theory. This density functional theory is a method of predicting an electronic state of a crystal by introducing a Hamiltonian that takes in a correlation effect among a large number of electrons. The principle of the density functional theory is based on a mathematical theorem that the entire energy of a ground state of a system can be represented by an electron density functional theory. The density functional theory has high reliability as a method of calculating the electronic state of the crystal.

Here, the density functional theory is suitable for predicting electronic states on the interfaces between the anchor particles 9 or the enclosure material 12 and the noble metal particles 8. It is recognized that the catalyst of the present embodiment designed based on a combination of the noble metal particles, the anchor particles and the enclosure material in which the combination is determined based on the actual simulation values, does not easily cause coarsening of the noble metal particles, and maintains high purification performance even after a high-temperature durability test. Analysis software for the simulations by use of the density functional theory as described above is commercially available, and one example of the calculation conditions of the analysis software will be as follows.

Pre/post: Materials studio 3.2 (Accelrys Software Inc.); Solver: DMol3 (Accelrys Software Inc.); temperature: absolute zero; Approximation: GGA approximation.

Note that, a significantly important function for an exhaust gas purifying catalyst for a vehicle is to sufficiently supply active oxygen to noble metal in order to purify exhaust gas. Therefore, an oxygen storage component (OSC material), which is provided adjacent to noble metal and functions to adsorb and release active oxygen at the time of atmospheric fluctuations of exhaust gas, is a particularly essential material in order to improve purification performance of the catalyst.

The exhaust gas purifying catalyst to which the OSC material is added is required to satisfy the following three conditions: (1) the amount of the OSC material in the catalyst (the amount of adsorbed and released oxygen); (2) the oxygen storage and release velocity of the OSC material; and (3) the distance between noble metal and the OSC material, all of which are significantly important.

With regard to the condition (1), if the amount of the OSC material in the catalyst is severely insufficient, active oxygen is not supplied sufficiently to noble metal in the case of a rich atmosphere. As a result, a decrease in performance for purification of CO and HC is caused. On the other hand, if the amount of the OSC material is excessive, active oxygen adsorbed by the OSC material is excessively released at the time of a large shift from a lean atmosphere to a stoichiometric or rich atmosphere. As a result, a decrease in performance for purification of NOx is caused. Therefore, there is a predetermined optimal amount of the OSC material in the catalyst, and the optimal amount of the OSC material may be measured by experiments. The amount of the OSC material differs depending on the type of noble metal and the amount of noble metal used in the catalyst; however, the amount of the OSC material is generally 5 to 100 g/L in terms of $CeO_2$ conversion per unit content.

Note that, as the distance between noble metal and the OSC material is closer, the supplying efficiency of active oxygen is increased when the amount of the OSC material in the exhaust gas purifying catalyst is the same. Therefore, active oxygen can be supplied to the noble metal in a much shorter period of time at the time of atmospheric fluctuations. Thus, when the distance between the noble metal and the OSC material is close, the catalyst is considered to achieve a performance improvement that is the same effect as the improvement of the condition (2): the oxygen storage and release velocity of the OSC material, among the three conditions described above.

A specific method of reducing the distance between the noble metal and the OSC material may be to support the noble metal on the OSC material. However, the configuration in which the noble metal is supported on the OSC material is not necessarily appropriate because of the following reasons. First, a large decrease in specific surface area of the OSC material is caused under an exhaust gas atmosphere at high temperature compared with alumina or the like. Therefore, when the noble metal is supported on the OSC material, a decrease in specific surface area is likely to be caused because of aggregation of the noble metal. In addition, rhodium (Rh) tends to have a higher catalytic activity in a reducing state, and tends to have a lower catalytic activity in a high oxidation state. In the case in which rhodium is supported directly on the OSC material, active oxygen is supplied mainly at the interface between Rh and the OSC material, and therefore, rhodium falls into a high oxidation state. As a result, a decrease in catalytic performance may be caused.

On the other hand, in the configuration in which the noble metal is not supported directly on the OSC material, the supply of active oxygen to the noble metal is delayed when there is a large distance between the OSC material and the noble metal. As a result, when a flow rate of exhaust gas is rapidly changed during acceleration and the like, and a catalytic atmosphere varies, a purification reaction cannot comply with the change. Accordingly, a decrease in purification performance of the catalyst is caused.

Therefore, in the simultaneous enclosure particles 5, an average distance between the centers of the catalyst units 13 containing the noble metal particles 8 and the anchor particles 9 and the centers of the promoter units 14 containing the first promoter particles 11 having an oxygen storage and release capacity is preferably within a range of 5 nm to 300 nm. Due to such an average distance, a decrease in catalytic activity caused by an excessive supply of active oxygen can be prevented while active oxygen is efficiently supplied to the noble metal. Particularly, the average distance between the centers of the catalyst units 13 and the centers of the promoter units 14 is more preferably within a range of 40 nm to 300 nm.

A measurement of the distances between the catalyst units 13 and the promoter units 14 in the anchor/promoter simultaneous enclosure particles may be carried out according to the following steps:

(1) a TEM-EDX analysis or HAADF-STEM analysis of the anchor/promoter simultaneous enclosure particles;

(2) an outline extraction of the anchor particles and the first promoter particles from images;

(3) a setting of circular approximation and each central point from surface areas based on the extracted outlines; and (4) a detection of the closest central points and a measurement of the distances.

The method of the measurement of the distances is not limited to the above-described method, and may be any methods as long as objectivization and repeatability can be ensured.

(1) TEM-EDX Analysis or HAADF Analysis of Anchor/Promoter Simultaneous Enclosure Particles The anchor/promoter simultaneous enclosure particles are subjected to embedding treatment using epoxy resin, followed by curing treatment. Thereafter, an ultrathin piece is obtained by use of an ultramicrotome. Using the ultrathin piece thus obtained, the simultaneous enclosure particles are observed by a transmission electron microscope (TEM), or by HAADF-STEM (High-Angle Annular Dark-Field Scanning Transmission Electron Microscopy), so as to discriminate among the anchor particles, the first promoter particles, and also the enclosure material. More specifically, with regard to the analysis conditions in the case of using TEM-EDX, the obtained images are focused on contrast (shadowed) areas first. Then, elemental species of the areas are analyzed and confirmed, so as to identify compound particles containing the elements.

Although the elemental species of the anchor particles and the first promoter particles may overlap each other, the anchor particles supporting noble metal are distinguishable from the first promoter particles by detecting the presence or absence of noble metal species using EDX (energy dispersive X-ray analyzer). However, when a particle diameter of the noble metal is smaller than a diameter of X-ray beam of the EDX, the noble metal may not be confirmed. In such a case, when the anchor particles and the first promoter particles contain cerium (Ce) or praseodymium (Pr) as an OSC material, it is preferable to discriminate between the anchor particles and the first promoter particles by comparing the contents of Ce or Pr in the anchor particles and the first promoter particles with the detected intensity ratio of Ce or Pr, which are preliminarily obtained. In the case of the HAADF-STEM images, the discrimination may be carried out according to contrasts.

(2) Outline Extraction of Anchor Particles and First Promoter Particle from Images The outline extraction of the anchor particles and the first promoter particle is carried out using the images obtained in the analysis of the step (1) described above. The extraction may be automatically carried out by contrasts using image processing software. Alternatively, the extraction may be manually carried out by transcription of the images on OHP sheets or the like.

(3) Definition of Circular Approximation and Each Central Point from Surface Areas Based on Extracted Outlines, and (4) Detection of Closest Central Point and Measurement of Distance The steps (3) and (4) may be carried out using commercially available image processing software. That is, the areas of the anchor particles and the first promoter particles are calculated according to the extracted outlines, and circles having the same areas as the anchor particles and the first promoter particles are presumed. Then, a first promoter particle closest to a specific anchor particle is detected, and the distance between the respective centers of the circles is measured. Accordingly, the distance between the particles can be obtained.

Figure 5:
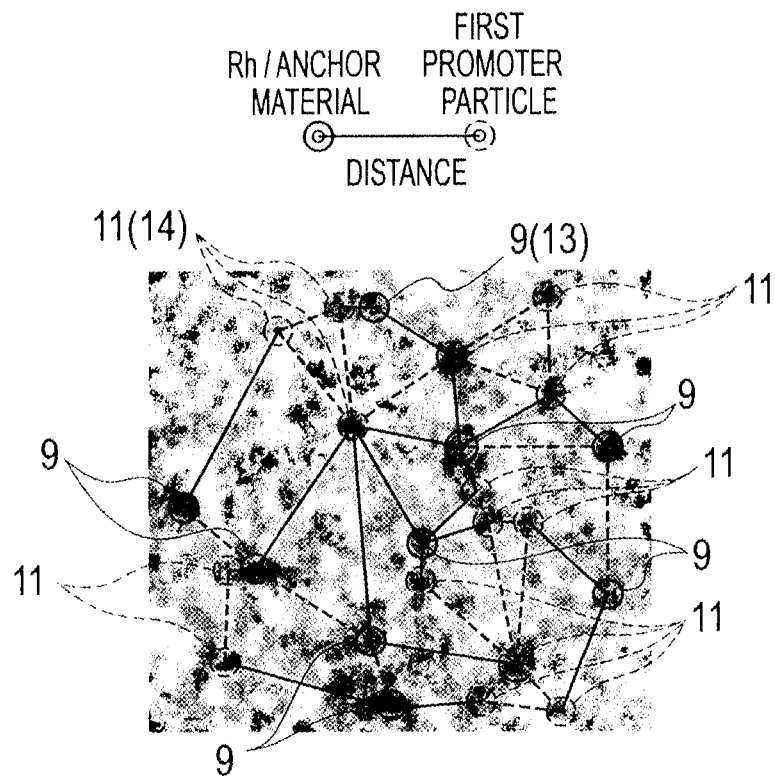
FIG. 5 is a micrograph showing distances between anchor particles and first promoter particles in anchor/promoter simultaneous enclosure particles.

FIG. 5 shows one example of TEM-EDX photographs of the anchor/promoter simultaneous enclosure particles. As shown in FIG. 5, the photograph obtained using the TEM-EDX is subjected to image processing so as to extract the outlines of the respective particles of the anchor particles 9 and the first promoter particles 11. Next, the areas of the respective particles are calculated, and circles having the same areas as the respective particles are presumed. Then, the first promoter particle 11 (the promoter unit 14) closest to the specific anchor particle 9 (the catalyst unit 13) is detected, and the distance between the respective centers of the circles is measured. Note that, in FIG. 5, the lines connecting anchor particles 9 to the first promoter particles 11 are indicated by a solid line, and the lines connecting the respective anchor particles 9 or the line connecting the respective first promoter particles 11 are indicated by a dashed line.

In addition, the anchor/promoter simultaneous enclosure particles 5 preferably have 40% or more of degree of dispersion of the catalyst units 13 and the promoter units 14, respectively, in the simultaneous enclosure particles. The degree of dispersion can be obtained according to the following formula 1.

$$\text{Degree of dispersion (\%)} = 100 - \frac{\sigma(\text{nm})}{Av \cdot (\text{nm})} \times 100 \qquad [\text{Math 1}]$$

In the formula, "σ" represents a standard deviation of a distribution of the distances between the respective centers of the catalyst units 13 and the promoter units 14 in the simultaneous enclosure particles 5. "Av." represents an average distance between the respective centers of the catalyst units 13 and the promoter units 14 in the simultaneous enclosure particles 5.

Figure 6:
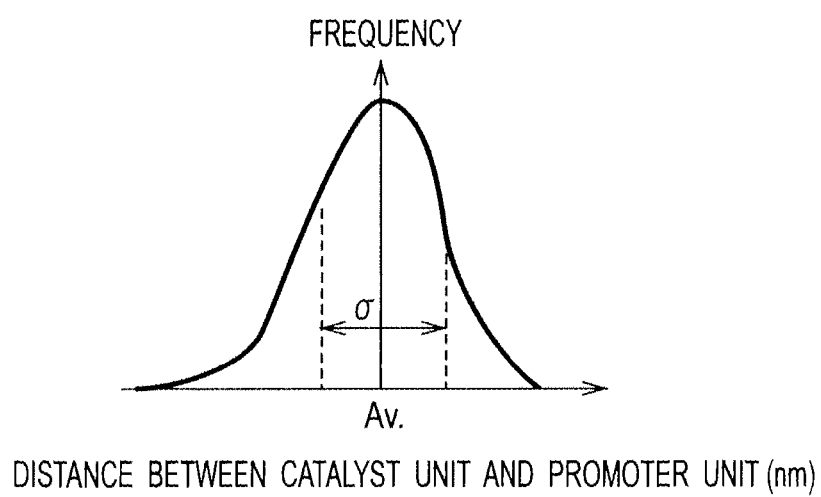
FIG. 6 is a graph showing a relationship between distances between respective centers of catalyst units and promoter units, and a frequency of appearance.

FIG. 6 is a graph showing a relationship between the distances between the respective centers of the catalyst units 13 and the promoter units 14 in the simultaneous enclosure particles 5, and frequency of appearance of the distances. As shown in FIG. 6, which is the graph obtained by the result of the measurement of the distances between the respective centers of the catalyst units 13 and the promoter units 14, when it is assumed that a frequency distribution is a normal distribution, the degree of dispersion is expressed as a probability of the presence of an arbitrary sample within the range of σ. Note that, the phrase "σ represents a standard deviation" means that 68.27% of the distances between the respective centers of the catalyst units 13 and the promoter units 14 are distributed within the range of the average center distance Av (nm)±σ (nm).

Figure 7:
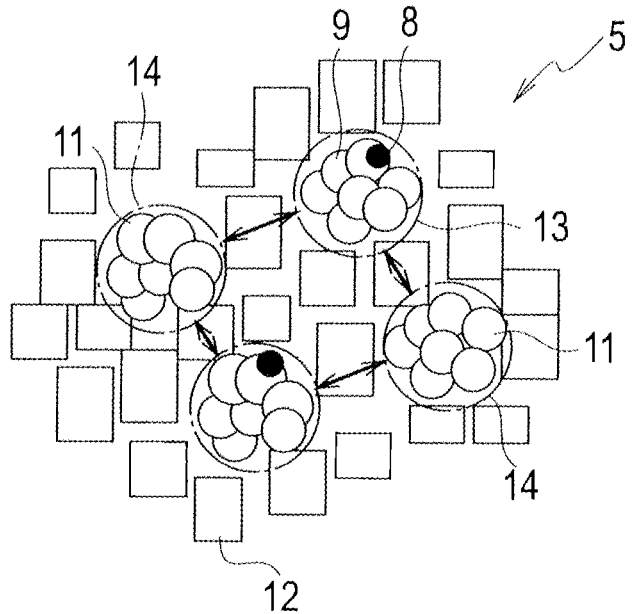
FIG. 7 is a schematic view showing examples of anchor/promoter simultaneous enclosure particles having different degrees of dispersion.
Figure 7:
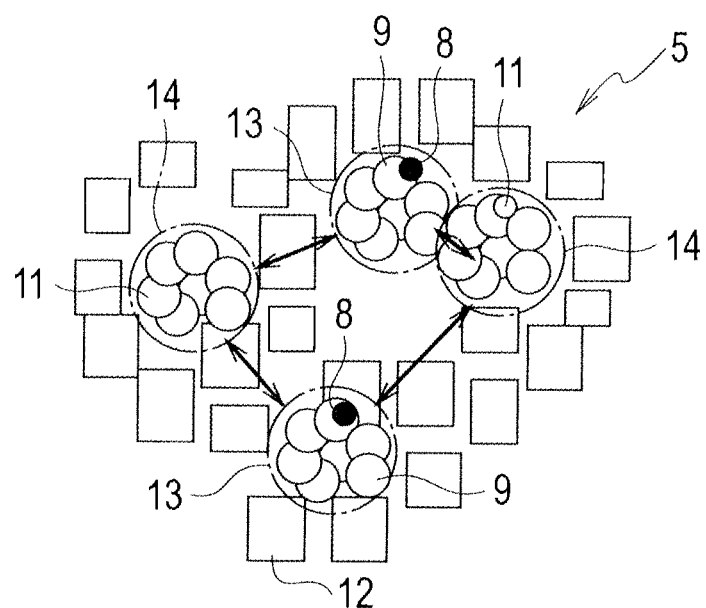

FIG. 7 shows a schematic view of an example of catalyst powder of which degree of dispersion is high (FIG. 7(a)), and a schematic view of an example of catalyst powder of which degree of dispersion is low (FIG. 7(b)). If all the distances between the catalyst units and the promoter units measured by TEM or the like would be equal, the degree of dispersion of the catalyst is 100% (this means that the dispersion of the distances is 0). When the dispersion of the distances is large, the degree of dispersion of the catalyst approximates 0%. Namely, when all the distances between the catalyst units and the promoter units are geometrically equal, σ is 0 and the degree of dispersion is 100%.

As described above, the degree of dispersion defined as such is preferably 40% or more. When the degree of dispersion is 40% or more, a sufficient distance between the respective particles is ensured, and unevenness is decreased to a low level. As a result, an aggregation between the compounds after a durability test is prevented. In particular, the degree of dispersion is preferably 50% or more.

This degree of dispersion is mutually related to the level of aggregation of the anchor particles and the first promoter particles immediately before drying slurry in which the anchor particles, the first promoter particles, and the precursor of the enclosure material are mixed. Since the level of aggregation is dependent on a stirring force of the slurry, the degree of dispersion can be improved when the slurry is intensively stirred.

[Second Promoter Particles]

As shown in FIG. 1(c), the second promoter particles 6 contained in the catalyst layer 3 are dispersed in the catalyst layer 3 together with the anchor/promoter simultaneous enclosure particles 5. Particularly, the second promoter particles 6 are provided in fine pores 5a formed between the plural simultaneous enclosure particles 5, so that the second promoter particles 6 can sufficiently adsorb oxygen in exhaust gas passing though the fine pores. Therefore, oxygen does not easily get deeply into the catalyst layer, and there is hardly any oxygen present at the periphery of the catalyst powder. Accordingly, nitrogen oxide can be reduced sufficiently. In addition, active oxygen adsorbed by the first promoter particles 11 and the second promoter particles 6 is released at the time of a large shift from a lean atmosphere to a stoichiometric or rich atmosphere. Thus, HC and CO can also be oxidized efficiently.

In the exhaust gas purifying catalyst according to the present embodiment, a weight ratio of the first promoter particles to the total weight of the first promoter particles and the second promoter particle is preferably 0.3 or more, more preferably between 0.4 and 0.8. When the weight ratio is within such a range, oxygen can be effectively adsorbed and released with respect to the noble metal particles on the anchor particles due to the first promoter particles while excessive oxygen is adsorbed by the second promoter particles. Therefore, NOx purification performance can be improved.

The second promoter particles 6 preferably contain at least one of cerium (Ce) and praseodymium (Pr) having an oxygen storage and release capacity as in the case of the first promoter particles 11. Particularly, the second promoter particles 6 preferably contain a compound as a main component having a high oxygen storage and release capacity, such as cerium oxide ($CeO_2$) and praseodymium oxide ($Pr_6O_{11}$).

The second promoter particles 6 are preferably an oxide further containing at least one element selected from the group consisting of iron (Fe), manganese (Mn), cobalt (Co) and nickel (Ni) as in the case of the first promoter particles 11. When at least one transition metal is contained in the second promoter particles 6, a catalytic activity, especially a purification rate of CO and NO, can be improved due to active oxygen contained in the transition metal.

In addition, the second promoter particles 6 preferably further contain at least one NOx adsorbing material selected from the group consisting of barium (Ba), magnesium (Mg), calcium (Ca), strontium (Sr) and sodium (Na). Since a compound containing such an element functions as a NOx adsorbing material, NOx purification performance can be improved.

An average particle diameter (D50) of the anchor/promoter simultaneous enclosure particles 5 and the second promoter particles 6 is preferably 6 μm or less. This average particle diameter is an average particle diameter of the simultaneous enclosure particles 5 and the second promoter particles 6 in the catalyst layer 3, as shown in FIG. 1(c). When the average particle diameter is more than 6 μm, a distance from the periphery to the center of each particle of the simultaneous enclosure particles 5 and the second promoter particles 6 is increased, and gas diffusion performance toward the center of the respective particles is significantly decreased. As a result, a reduction in purification performance may be caused. In addition, when the average particle diameter is more than 6 μm, exfoliation or unevenness of the coating material in the case of coating on the honeycomb substrate tends to be easily caused. The average particle diameter of the anchor/promoter simultaneous enclosure particles 5 and the second promoter particles 6 is more preferably within a range of 1 μm to 4 μm, so that proper gaps are formed between the particles and exfoliation can be further prevented. The average particle diameter of the anchor/promoter simultaneous enclosure particles 5 and the second promoter particles 6 may be obtained by analysis of slurry containing the respective particles using a laser diffraction particle size distribution analyzer.

In the exhaust gas purifying catalyst 1 according to the present embodiment, the undercoat layer 4 containing an inorganic oxide having heat resistance may be provided under the catalyst layer as a lowermost layer as shown in FIG. 1(b). The undercoat layer 4 is mainly provided on the corners of each cell 2a of the honeycomb substrate 2. Therefore, the catalyst active component in the catalyst layer covering the undercoat layer 4 is prevented from being present locally on the cell corners, a decrease in the amount of the catalyst active component to be provided on the flat portions (on the cell walls) is suppressed, and the catalyst layer is prevented from falling off the substrate. One example of the inorganic oxide having heat resistance in the undercoat layer may be alumina.

[Method for Manufacturing Exhaust Gas Purifying Catalyst]

The following is an explanation of a method for manufacturing the exhaust gas purifying catalyst according to the embodiment of the present invention. The method for manufacturing the catalyst of the present invention includes a step of pulverizing the composite particles of the noble metal particles and the anchor particles and the first promoter particles individually or concurrently. The method further includes a step of mixing the pulverized composite particles and the pulverized first promoter particles with slurry containing a precursor of the enclosure material, followed by drying, so as to prepare the anchor/promoter simultaneous enclosure particles. The method further includes a step of mixing the anchor/promoter simultaneous enclosure particles with the second promoter particles, followed by pulverizing.

In the simultaneous enclosure particles 5, the noble metal particles 8 are supported on the anchor particles 9. The noble metal particles 8 may be supported by use of an impregnation method. Then, the anchor particles 9 supporting the noble metal particles 8 on the surfaces thereof are pulverized by use of a bead mill or the like so as to have a desired particle diameter. Similarly, the first promoter particles 11 are pulverized by used of a bead mill or the like to have a desired particle diameter. In this case, the anchor particles 9 and the first promoter particles 11 may be pulverized in a mixed state, or may be pulverized individually. Note that, when a fine raw material such as an oxide colloid is used as a raw material for the anchor particles 9 and/or the first promoter particles 11, the pulverizing step may be omitted.

When the anchor particles and the first promoter particles are enclosed with the enclosure material after pulverization, it is preferable not to mix the enclosed anchor particles with the enclosed first promoter particles, but to enclose the anchor particles and the first promoter particles concurrently with the enclosure material. Accordingly, the anchor particles and the first promoter particles can be dispersed uniformly without unevenness.

More specifically, the anchor particles and the first promoter particles are added to slurry in which a precursor of the enclosure material is dispersed, and the mixture is then stirred. When the slurry is stirred, the precursor of the enclosure material is adhered to the peripheries of the anchor particles 9 and the first promoter particles 11. At this time, the slurry is intensively stirred so that the respective particles are dispersed in the slurry properly. As a result, the degree of dispersion can be improved. Subsequently, the mixed slurry is dried and baked. Thus, the anchor/promoter simultaneous enclosure particles 5 in which the enclosure material is provided at the peripheries of the anchor particles 9 and the first promoter particles 11 can be obtained.

Thereafter, the anchor/promoter simultaneous enclosure particles and the second promoter particles are mixed and then pulverized. The anchor/promoter simultaneous enclosure particles and the second promoter particles may be subjected to either wet pulverization or dry pulverization. In general, the anchor/promoter simultaneous enclosure particles and the second promoter particles are added to a solvent such as deionized water, and the mixture thus obtained is stirred and pulverized using a ball mill or the like, so as to obtain catalyst slurry. At this time, a binder is added to the catalyst slurry as necessary. An average particle diameter (D50) of the anchor/promoter simultaneous enclosure particles and the second promoter particles in the catalyst slurry is preferably 6 μm or less as described above. Subsequently, the catalyst slurry is applied to the inner surface of the honeycomb substrate, followed by drying and baking. Thus, the exhaust gas purifying catalyst can be obtained.

[Exhaust Gas Purifying System]

Figure 8:
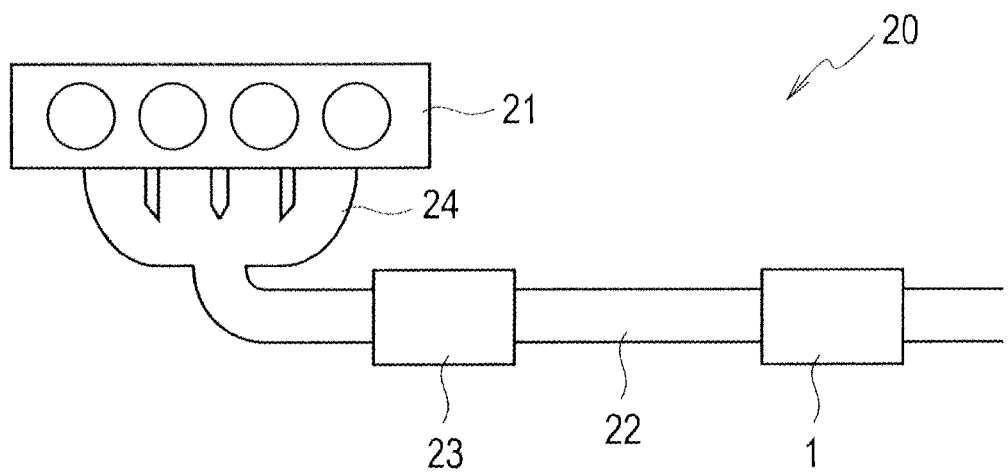
FIG. 8 is a schematic view showing an exhaust gas purifying system according to an embodiment of the present invention.

As shown in FIG. 8, an exhaust gas purifying system 20 according to the present embodiment may have a configuration in which a three-way catalyst 23 is provided upstream of an exhaust gas flow path 22 of an internal combustion engine 21, and the exhaust gas purifying catalyst 1 according to the present embodiment is provided downstream of the three-way catalyst 23. The three-way catalyst 23 may be provided immediately under an exhaust manifold 24 so that the three-way catalyst 23 is activated in an early stage.

The exhaust gas purifying system 20 according to the present embodiment that has the above-described configuration can activate the three-way catalyst 23 promptly, and purify exhaust gas even in a low temperature region. In addition, even when the three-way catalyst 23 cannot purify NOx completely, the exhaust gas purifying catalyst 1 provided downstream thereof can finally purify NOx with high efficiency since the exhaust gas purifying catalyst 1 has a high NOx purification capacity. Note that, the exhaust gas purifying system according to the present invention is not limited to the configuration shown in FIG. 8. For example, an additional three-way catalyst or NOx adsorbing catalyst may be provided in front of or behind the exhaust gas purifying catalyst 1. In addition, the exhaust gas purifying catalyst 1 according to the present invention may be applied to various internal combustion engines such as a gasoline engine, a lean-burn engine, a direct-injection engine and a diesel engine.

EXAMPLES

Hereinafter, the present invention will be described in more detail in accordance with examples and Comparative examples. However, the present invention is not limited to the examples.

Example 1

Preparation of Simultaneous Enclosure Particles (1) A Zr—La composite oxide (anchor material) was impregnated with a rhodium nitrate aqueous solution, followed by drying at 150° C. for 12 hours and baking at 400° C. for one hour, so as to obtain Rh-supporting Zr—La composite oxide powder. Subsequently, the powder thus obtained was put into pure water in such a manner that a solid content to be obtained was 40%, followed by pulverizing by a bead mill, so as to obtain Rh-containing anchor material slurry. An average secondary particle diameter (D50) of the anchor material (Zr—La composite oxide) in the Rh-containing anchor material slurry is shown in Table 1. The average secondary particle diameter was measured by use of a laser diffraction/scattering particle size distribution analyzer LA-920 manufactured by Horiba, Ltd.

(2) Subsequently, a Zr—Ce—Nd composite oxide (first promoter particles) was put into pure water in such a manner that a solid content to be obtained was 40%, followed by pulverizing by a bead mill, so as to obtain first promoter particle slurry. An average secondary particle diameter (D50) of the first promoter particles (Zr—Ce—Nd composite oxide) in the first promoter particle slurry is shown in Table 1.

(3) A certain amount of the respective slurries obtained in (1) and (2) was mixed with a certain amount of slurry in which boehmite (enclosure material precursor) and nitric acid were preliminarily mixed, followed by stirring, so as to obtain mixed slurry.

(4) Thereafter, the mixed slurry was dried, and then baked at 550° C. for three hours in airflow, so as to obtain simultaneous enclosure particles of this example.

(Preparation of Pt Catalyst Powder)

(1) A Ce—Zr composite oxide was impregnated with an aqueous solution of dinitrodiamine platinum, followed by drying at 150° C. for 12 hours and baking at 400° C. for one hour, so as to obtain Pt-supporting Ce—Zr composite oxide powder. Subsequently, the powder thus obtained was put into pure water in such a manner that a solid content to be obtained was 40%, followed by pulverizing by a bead mill, so as to obtain. Pt-containing Ce—Zr composite oxide slurry.

(2) A certain amount of the slurry obtained in (1) was mixed with a certain amount of slurry in which boehmite and nitric acid were preliminarily mixed, followed by stirring, so as to obtain mixed slurry.

(3) Thereafter, the mixed slurry was dried, and then baked at 550° C. for three hours in airflow, so as to obtain Pt catalyst powder of this example.

(Application to Honeycomb Substrate)

(1) Inner Layer Coat $Al_2O_3$ powder, 8% by mass boehmite with respect to the $Al_2O_3$ powder, and a nitric acid aqueous solution were put into a magnetic alumina pot. Subsequently, alumina balls were put into the magnetic alumina pot, followed by shaking, so as to obtain slurry not containing noble metal components.

The slurry thus obtained was applied inside a cordierite honeycomb substrate (ø: 110 mm; content: 0.92 L; 4 mil/600 cpsi), and redundant slurry was removed by airflow, followed by drying at 120° C. under ventilation. Thereafter, the honeycomb substrate was baked at 400° C. for one hour in air so as to form an undercoat layer. In this case, the coating amount of the undercoat layer per 1 L of the honeycomb substrate was 50 g/L.

(2) Middle Layer Coat

Slurry of the above-described Pt catalyst powder was prepared in the same manner as the inner layer coat. Subsequently, the Pt catalyst powder slurry was applied to the honeycomb substrate on which the undercoat layer was formed, followed by drying and baking in the same manner as the inner layer coat. Thus, a Pt-containing catalyst layer with the content of 60 g/L per 1 L of the honeycomb substrate was formed. In this case, the Pt content per 1 L of the honeycomb substrate was 0.29 g/L.

(3) Uppermost Layer Coat

The simultaneous enclosure particles, Zr—Ce—Nd composite oxide powder (second promoter particles), 8% by mass boehmite with respect to the simultaneous enclosure particles and Zr—Ce—Nd composite oxide powder, and a nitric acid aqueous solution were put into a magnetic alumina pot. Subsequently, alumina balls were put into the magnetic alumina pot, followed by shaking, so as to obtain simultaneous enclosure particles-second promoter-containing slurry. In this case, a ratio of the weight of the first promoter particles to the total weight of the first promoter particles and the second promoter particles was adjusted to the value shown in Table 1. An average particle diameter (D50) of the simultaneous enclosure particles and the second promoter particles in the simultaneous enclosure particles-second promoter-containing slurry is also shown in Table 1 (refer to the particle diameter of catalyst powder in the table).

Thereafter, the simultaneous enclosure particles-second promoter-containing slurry was applied to the honeycomb substrate on which the Pt-containing catalyst layer was formed, followed by drying and baking in the same manner as the middle layer coat. Thus, a Rh-containing catalyst layer with the content of 100 g/L per 1 L of the honeycomb substrate was formed. In this case, the Rh content per 1 L of the honeycomb substrate was 0.06 g/L. A ratio of the total weight of the anchor material and the first promoter particles and the weight of the enclosure material is also shown in Table 1.

Example 2

A catalyst of Example 2 was obtained in the same manner as Example 1 except that the content of the first promoter particles was changed in such a manner that the ratio of the weight of the first promoter particles to the total weight of the first promoter particles and the second promoter particles was adjusted to the value shown in Table 1.

Example 3

A catalyst of Example 3 was obtained in the same manner as Example 1 except that the condition of the bead mill was changed in such a manner that the average secondary particle diameter (D50) of the first promoter particles (Zr—Ce—Nd composite oxide) in the simultaneous enclosure particles was adjusted to the value shown in Table 1.

Example 4

A catalyst of Example 4 was obtained in the same manner as Example 1 except that the condition of the cordierite honeycomb substrate was changed to ø: 36 min, the content: 0.12 L; 4 mil/600 cpsi.

Examples 5 to 9 and 12 to 14

Catalysts of Examples 5 to 9 and 12 to 14 were obtained in the same manner as Example 1 except that the first and second promoter particles in Example 1 were changed to the respective material components shown in Table 2 and Table 3, the average secondary particle diameters (D50) of the anchor particles and the first promoter particles were changed to the respective values shown in Table 2 and Table 3, and the honeycomb substrate in Example 4 was used.

Example 10

A catalyst of Example 10 was obtained in the same manner as Example 1 except that, when the simultaneous enclosure particles-second promoter-containing slurry in the uppermost layer coat was prepared, the shaking of the magnetic alumina pot was controlled so that the particle diameter of the simultaneous enclosure particles and the second promoter particles in the slurry was adjusted to 7.0 μm, and the honeycomb substrate in Example 4 was used.

Example 11

A catalyst of Example 11 was obtained in the same manner as Example 1 except that the degree of dispersion in Example 1 was changed to the value shown in Table 2, and the honeycomb substrate in Example 4 was used. Note that, the degree of dispersion was changed by the decrease in stirring force at the time of mixing the Rh-containing anchor material slurry, the first promoter slurry and the boehmite slurry in the step of preparing the simultaneous enclosure particles.

Example 15

A catalyst of Example 15 was obtained in the same manner as Example 1 except that the anchor material in Example 1 was changed to the material component shown in Table 3, and the honeycomb substrate in Example 4 was used.

Examples 16 to 19

Catalysts of Examples 16 to 19 were obtained in the same manner as Example 1 except that the enclosure material in Example 1 was changed to the material component shown in Table 3, and the honeycomb substrate in Example 4 was used. Note that, the respective additive amounts of Ba, Mg, La and Na with respect to alumina are 5% by weight as an oxide.

Comparative Example 1

Preparation of Simultaneous Enclosure Particles and Preparation of Pt Powder

Simultaneous enclosure particles and Pt catalyst powder were obtained in the same manner as Example 1.
(Application to Honeycomb Substrate)
First, the simultaneous enclosure particles, 8% by mass boehmite with respect to the simultaneous enclosure particles, and a nitric acid aqueous solution were put into a magnetic alumina pot. Subsequently, alumina balls were put into the magnetic alumina pot, followed by shaking, so as to obtain simultaneous enclosure particle-containing slurry. An average particle diameter (D50) of the simultaneous enclosure particles in the simultaneous enclosure particle-containing slurry is shown in Table 1 (refer to the particle diameter of catalyst powder in the table).
Next, an inner layer and a middle layer were formed on the honeycomb substrate in the same manner as Example 1. Thereafter, the simultaneous enclosure particle-containing slurry was applied to the honeycomb substrate on which the Pt-containing catalyst layer was formed, followed by drying and baking in the same manner as Example 1. Thus, a Rh-containing catalyst layer with the content of 100 g/L per 1 L of the honeycomb substrate was formed. In this case, the Rh content per 1 L of the honeycomb substrate was 0.06 g/L. In addition, the additive amount of the first promoter particles was adjusted in such a manner that the total amount of the promoter particles contained in the uppermost layer was the same as that in Example 1. Note that, Comparative example 1 is an example in which the second promoter particles are not contained.

Comparative Example 2

Preparation of Rh Powder (1) A Zr—La composite oxide (anchor material) was impregnated with a rhodium nitrate aqueous solution, followed by drying at 150° C. for 12 hours and baking at 400° C. for one hour, so as to obtain Rh-supporting Zr—La composite oxide powder. Subsequently, the powder thus obtained was put into pure water in such a manner that a solid content to be obtained was 40%, followed by pulverizing by a bead mill, so as to obtain Rh-containing anchor material slurry. An average secondary particle diameter (D50) of the Zr—La composite oxide in the Rh-containing anchor material slurry is shown in Table 1.

(2) A certain amount of the slurry obtained in (1) was mixed with a certain amount of slurry in which boehmite (enclosure material precursor) and nitric acid were preliminarily mixed, followed by stirring, so as to obtain mixed slurry.

(3) Thereafter, the mixed slurry was dried, and then baked at 550° C. for three hours in airflow, so as to obtain enclosure powder of this example.

(Preparation of Pt Powder)
Pt catalyst powder was obtained in the same manner as Example 1.

(Application to Honeycomb Substrate)
First, the enclosure powder, Zr—Ce—Nd composite oxide powder (second promoter particles), 8% boehmite with respect to the enclosure powder and the Zr—Ce—Nd composite oxide powder, and a nitric acid aqueous solution were put into a magnetic alumina pot. Subsequently, alumina balls were put into the magnetic alumina pot, followed by shaking, so as to obtain enclosure powder-second promoter-containing slurry. A particle diameter of the enclosure powder and the second promoter particles in the enclosure powder-second promoter-containing slurry is shown in Table 1 (refer to the particle diameter of catalyst powder in the table).

Next, an inner layer and a middle layer were formed on the honeycomb substrate in the same manner as Example 1. Thereafter, the enclosure powder-second promoter-containing slurry was applied to the honeycomb substrate on which the Pt-containing catalyst layer was formed, followed by drying and baking in the same manner as Example 1. Thus, a Rh-containing catalyst layer with the content of 100 g/L per 1 L of the honeycomb substrate was formed. In this case, the Rh content per 1 L of the honeycomb substrate was 0.06 g/L. In addition, the additive amount of the second promoter particles was adjusted in such a manner that the total amount of the promoter particles contained in the uppermost layer was the same as that in Example 1. Note that, Comparative example 2 is an example in which the first promoter particles are not contained.

Comparative Example 3

A catalyst of Comparative example 3 was obtained in the same manner as Example 1 except that the first and second promoter particles in Example 1 were not added to the catalyst of this example, and the honeycomb substrate in Example 4 was used.

Table 4 shows the content of the respective elements in the composite oxides used in Examples 1 to 19 and Comparative examples 1 to 3.

TABLE 1

| | Anchor Particles | | Promoter | | |
|---|---|---|---|---|---|
| | Noble Metal | Type | Average Secondary Particle Diameter (nm) | Type of First and Second Promoter Particles | Average Secondary Particle Diameter of First Promoter Particles (nm) | Weight of First Promoter/ (Total Weight of First and Second Promoters) |
| Example 1 | Rh | Zr—La—$O_x$ | 141 | Zr—Ce—Nd—$O_x$ | 150 | 0.56 |
| Example 2 | Rh | Zr—La—$O_x$ | 141 | Zr—Ce—Nd—$O_x$ | 150 | 0.47 |
| Example 3 | Rh | Zr—La—$O_x$ | 156 | Zr—Ce—Nd—$O_x$ | 325 | 0.56 |
| Comparative Example 1 | Rh | Zr—La—$O_x$ | 141 | Zr—Ce—Nd—$O_x$ | 150 | 1.00 |
| Comparative Example 2 | Rh | Zr—La—$O_x$ | 141 | Zr—Ce—Nd—$O_x$ | — | 0.00 |

| | Average Distance between Catalyst Units and Promoter Units (nm) | (Anchor Particles + First Promoter): Enclosure Material (wt %) | Enclosure Material | Degree of Dispersion (%) | Particle Diameter of Catalyst Powder (μm) | NOx Residual Rate (%) |
|---|---|---|---|---|---|---|
| Example 1 | 160 | 70:30 | $Al_2O_3$ | 55 | 2.9 | 12.4 |
| Example 2 | 154 | 70:30 | $Al_2O_3$ | 51 | 2.9 | 13.0 |
| Example 3 | 291 | 70:30 | $Al_2O_3$ | 47 | 2.7 | 14.1 |
| Comparative Example 1 | 155 | 70:30 | $Al_2O_3$ | 55 | 2.9 | 14.3 |
| Comparative Example 2 | — | — | $Al_2O_3$ | — | 3.1 | 18.5 |

TABLE 2

| | Anchor Particles | | | Promoter | | |
|---|---|---|---|---|---|---|
| | Noble Metal | Type | Average Secondary Particle Diameter (nm) | Type of First and Second Promoter Particles | Average Secondary Particle Diameter of First Promoter Particles (nm) | Weight of First Promoter/ (Total Weight of First and Second Promoters) |
| Example 4 | Rh | Zr—La—$O_x$ | 141 | Zr—Ce—Nd—$O_x$ | 150 | 0.56 |
| Example 5 | Rh | Zr—La—$O_x$ | 161 | Zr—Pr—Nd—$O_x$ | 175 | 0.56 |
| Example 6 | Rh | Zr—La—$O_x$ | 161 | Zr—Ce—Nd—Fe—$O_x$ | 261 | 0.56 |
| Example 7 | Rh | Zr—La—$O_x$ | 161 | Zr—Ce—Nd—Mn—$O_x$ | 230 | 0.56 |
| Example 8 | Rh | Zr—La—$O_x$ | 161 | Zr—Ce—Nd—Co—$O_x$ | 241 | 0.56 |
| Example 9 | Rh | Zr—La—$O_x$ | 161 | Zr—Ce—Nd—Ni—$O_x$ | 184 | 0.56 |
| Example 10 | Rh | Zr—La—$O_x$ | 141 | Zr—Ce—Nd—$O_x$ | 150 | 0.56 |
| Example 11 | Rh | Zr—La—$O_x$ | 141 | Zr—Ce—Nd—$O_x$ | 150 | 0.56 |
| Comparative Example 3 | Rh | Zr—La—$O_x$ | 161 | — | — | — |

| | Average Distance between Catalyst Units and Promoter Units (nm) | (Anchor Particles + First Promoter): Enclosure Material (wt %) | Enclosure Material | Degree of Dispersion (%) | Particle Diameter of Catalyst Powder (μm) | NOx Residual Rate (%) |
|---|---|---|---|---|---|---|
| Example 4 | 160 | 70:30 | $Al_2O_3$ | 55 | 2.9 | 95 |
| Example 5 | 177 | 70:30 | $Al_2O_3$ | 49 | 2.7 | 94 |
| Example 6 | 246 | 70:30 | $Al_2O_3$ | 53 | 3.0 | 99 |
| Example 7 | 220 | 70:30 | $Al_2O_3$ | 48 | 3.0 | 97 |
| Example 8 | 231 | 70:30 | $Al_2O_3$ | 45 | 2.8 | 97 |
| Example 9 | 190 | 70:30 | $Al_2O_3$ | 56 | 3.1 | 95 |
| Example 10 | 160 | 70:30 | $Al_2O_3$ | 55 | 7.0 | 82 |
| Example 11 | 217 | 70:30 | $Al_2O_3$ | 32 | 3.2 | 88 |
| Comparative Example 3 | — | — | $Al_2O_3$ | — | 3.4 | 76 |

TABLE 3

| | Noble Metal | Anchor Particles Type | Average Secondary Particle Diameter (nm) | Promoter Type of First and Second Promotor Particles | Average Secondary Particle Diameter of First Promoter Particles (nm) | Weight of First Promoter/ (Total Weight of First and Second Promoters) |
|---|---|---|---|---|---|---|
| Example 12 | Rh | Zr—La—O$_x$ | 152 | Zr—Ce—Nd—Ba—O$_x$ | 196 | 0.56 |
| Example 13 | Rh | Zr—La—O$_x$ | 152 | Zr—Ce—Nd—Mg—O$_x$ | 223 | 0.56 |
| Example 14 | Rh | Zr—La—O$_x$ | 152 | Zr—Ce—Nd—Na—O$_x$ | 174 | 0.56 |
| Example 15 | Rh | Zr—La—Ba—O$_x$ | 210 | Zr—Ce—Nd—O$_x$ | 169 | 0.56 |
| Example 16 | Rh | Zr—La—O$_x$ | 152 | Zr—Ce—Nd—O$_x$ | 169 | 0.56 |
| Example 17 | Rh | Zr—La—O$_x$ | 152 | Zr—Ce—Nd—O$_x$ | 169 | 0.56 |
| Example 18 | Rh | Zr—La—O$_x$ | 152 | Zr—Ce—Nd—O$_x$ | 169 | 0.56 |
| Example 19 | Rh | Zr—La—O$_x$ | 152 | Zr—Ce—Nd—O$_x$ | 169 | 0.56 |

| | Average Distance between Catalyst Units and Promoter Units (nm) | (Anchor Particles + First Promoter): Enclosure Material (wt %) | Enclosure Material | Degree of Dispersion (%) | Particle Diameter of Catalyst Powder (μm) | NOx Residual Rate (%) |
|---|---|---|---|---|---|---|
| Example 12 | 209 | 70:30 | Al$_2$O$_3$ | 51 | 3.4 | 88 |
| Example 13 | 215 | 70:30 | Al$_2$O$_3$ | 56 | 3.1 | 84 |
| Example 14 | 186 | 70:30 | Al$_2$O$_3$ | 47 | 2.9 | 69 |
| Example 15 | 220 | 70:30 | Al$_2$O$_3$ | 52 | 3.0 | 70 |
| Example 16 | 173 | 70:30 | Ba/Al$_2$O$_3$ | 57 | 2.7 | 85 |
| Example 17 | 180 | 70:30 | Mg/Al$_2$O$_3$ | 51 | 2.5 | 86 |
| Example 18 | 192 | 70:30 | La/Al$_2$O$_3$ | 50 | 2.9 | 76 |
| Example 19 | 185 | 70:30 | Na/Al$_2$O$_3$ | 50 | 3.1 | 75 |

TABLE 4

| | Corresponding Example and Comparative Example | Type of Oxide (wt %) | | | | | | | | | | | |
|---|---|---|---|---|---|---|---|---|---|---|---|---|---|
| | | ZrO$_2$ | CeO$_2$ | Pr$_6$O$_{11}$ | Nd$_2$O$_3$ | Fe$_2$O$_3$ | MnO$_2$ | Co$_3$O$_4$ | NiO | BaO | MgO | Na$_2$O | La$_2$O$_3$ |
| Zr—La—O$_x$ | Examples 1 to 14, 16 to 19, Comparative Examples 1 to 3 | 88 | — | — | — | — | — | — | — | — | — | — | 12 |
| Zr—Ce—Nd—O$_x$ | Examples 1 to 5, 10 to 11, 15 to 19, Comparative Examples 1 to 2 | 70 | 20 | — | 10 | — | — | — | — | — | — | — | — |
| Zr—Pr—Nd—O$_x$ | Example 5 | 70 | — | 20 | 10 | — | — | — | — | — | — | — | — |
| Zr—Ce—Nd—Fe—O$_x$ | Example 6 | 69 | 20 | — | 10 | 1 | — | — | — | — | — | — | — |
| Zr—Ce—Nd—Mn—O$_x$ | Example 7 | 69 | 20 | — | 10 | — | 1 | — | — | — | — | — | — |
| Zr—Ce—Nd—Co—O$_x$ | Example 8 | 69 | 20 | — | 10 | — | — | 1 | — | — | — | — | — |
| Zr—Ce—Nd—Ni—O$_x$ | Example 9 | 69 | 20 | — | 10 | — | — | — | 1 | — | — | — | — |
| Zr—Ce—Nd—Ba—O$_x$ | Example 12 | 63 | 18 | — | 9 | — | — | — | — | 10 | — | — | — |
| Zr—Ce—Nd—Mg—O$_x$ | Example 13 | 68 | 19.5 | — | 10 | — | — | — | — | — | 3 | — | — |
| Zr—Ce—Nd—Na—O$_x$ | Example 14 | 68.5 | 19.5 | — | 10 | — | — | — | — | — | — | 2 | — |
| Zr—La—Ba—O$_x$ | Example 15 | 79 | — | — | — | — | — | — | — | 10 | — | — | 11 |

[Evaluation 1]

The catalysts of Examples 1 to 3 and Comparative examples 1 and 2 were subjected to treatment for a durability test. Thereafter, the NOx residual rate for each example was observed. With regard to the method of the treatment for the durability test, the respective catalysts of the examples and the Comparative examples were installed in an exhaust system of a 3500-cc gasoline engine, and then driven for 200 hours at the catalyst inside temperature of 880° C. Unleaded gasoline was used for fuel. For the observation of the NOx residual rate, a three-way catalyst was installed immediately under an exhaust manifold of a 1500-cc gasoline engine, and the respective catalysts of the examples and the Comparative examples after the durability test were further installed downstream of the three-way catalyst (underfloor position). Thereafter, the engine was driven in Japanese emission test cycle JC08 mode, and the NOx residual rate was then obtained according to the NOx concentration at each inlet and outlet of the respective catalysts of the examples and the Comparative examples based on the following formula 2.

$$NOx \text{ residual rate } (\%) = \frac{NOx \text{ concentration at catalyst outlet}}{NOx \text{ concentration at catalyst inlet}} \times 100 \quad \text{[Math 2]}$$

The distances between the catalyst units (anchor particles) and the promoter unit (first promoter particles) of the respective catalysts were measured by a TEM-EDX analyzer (HF- 2000, manufactured by Hitachi, Ltd.). The acceleration voltage at this time was 200 kV. The condition for cutting by an ultramicrotome was room temperature. From the image obtained by the TEM-EDX analyzer, the outlines of the anchor particles and the first promoter particles were extracted by using an image analyzer (KS-400, manufactured by Carl Zeiss, Inc.). Subsequently, the areas of the respective particles were calculated based on the extracted outlines, the circular approximations and the central points were defined, and the closest central points were detected to measure the distances therebetween. Thus, the distances between the catalyst units and the promoter units were obtained. The degree of dispersion of the respective catalysts was obtained based on the formula 1 described above. Table 1 shows the average distance between the respective centers of the catalyst units and the promoter units, the degree of dispersion, and the NOx residual rate in Examples 1 to 3 and Comparative examples 1 and 2, respectively.

[Evaluation 2]

The catalysts of Examples 4 to 11 and Comparative example 3 were subjected to treatment for a durability test. Thereafter, the NOx conversion rate for each example was observed. With regard to the method of the treatment for the durability test, the catalysts of the respective examples were installed in an exhaust system of a 3500-cc gasoline engine, and then driven for 50 hours at the catalyst inlet temperature of 820° C. Unleaded gasoline was used for fuel. For the observation of the NOx conversion rate, the respective catalysts of the examples and the Comparative examples after the durability test were installed in an exhaust system of a 2400-cc gasoline engine. Subsequently, the engine was driven in such a manner that the catalyst inlet temperature was 400° C. Thus, the NOx conversion rate was obtained according to the NOx concentration at each inlet and outlet of the respective catalysts of the examples and the Comparative examples based on the following formula 3.

$$NOx \text{ conversion rate } (\%) = \frac{(NOx \text{ concentration at catalyst inlet}) - (NOx \text{ concentration at catalyst outlet})}{NOx \text{ concentration at catalyst inlet}} \times 100 \quad \text{[Math 3]}$$

[Evaluation 3]

The catalysts of Examples 12 to 19 were subjected to treatment for a durability test. Thereafter, the NOx conversion rate for each example was observed. With regard to the method of the treatment for the durability test, the catalysts of the respective examples were installed in an exhaust system of a 3500-cc gasoline engine, and then driven for 50 hours at the catalyst inlet temperature of 700° C. Unleaded gasoline was used for fuel. For the observation of the NOx conversion rate, the catalysts of the respective examples after the durability test were installed in an exhaust system of a 2000-cc gasoline engine. Subsequently, the operation in a lean atmosphere (A/F: 25) for 40 seconds and the operation in a rich atmosphere (A/F: 11) for two seconds were repeated, and the engine was then driven in such a manner that the catalyst inlet temperature was 300 to 350° C. Thus, the NOx conversion rate was obtained according to the NOx concentration at each inlet and outlet of the respective catalysts of the examples based on the formula 3.

Figure 9:
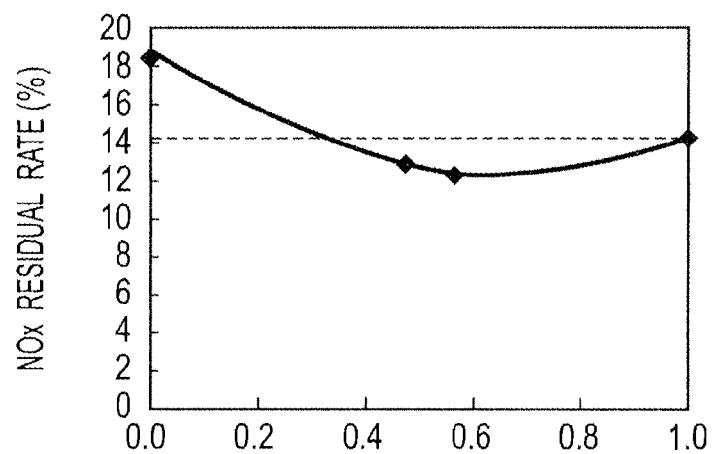
FIG. 9 is a graph showing a relationship between a weight ratio of first promoter particles to the total weight of first and second promoter particles, and a NOx residual rate.

The respective uppermost layers in Examples 1 and 2 contain both the anchor/promoter simultaneous enclosure particles and the second promoter particles. The uppermost layer in Comparative example 1 does not contain the second promoter particles, and the uppermost layer in Comparative example 2 does not contain the first promoter particles. According to the graph of FIG. 9 showing the NOx residual rates in Examples 1 and 2 and Comparative examples 1 and 2 the NOx residual rates in Examples 1 and 2 that contain both the first and second promoter particles are decreased compared to those in Comparative examples 1 and 2. This may be an effect that excessive oxygen does not easily get deeply into the catalyst layer due to the addition of the second promoter particles, and as a result, the NOx purification performance in the uppermost layer and the middle layer is improved. According to FIG. 9, it is also recognized that the NOx residual rate is significantly decreased when the weight ratio of the first promoter particles to the total weight of the first promoter particles and the second promoter particles is particularly between 0.4 and 0.8.

In addition, in Examples 1 to 3, the NOx residual rate is decreased as the average secondary particle diameter of the first promoter particles is decreased. This may be an effect that the surface areas of the first promoter particles are greatly increased, and as a result, the supply rate of active oxygen is improved.

Further, according to Examples 4 to 11 and Comparative example 3, the first and second promoter particles are added, and transition metal is further added to the first and second promoter particles, so that a quite high NOx purification rate can be achieved. In Examples 4 and 10, the NOx conversion rate is slightly decreased when the average particle diameter (D50) of the anchor/promoter simultaneous enclosure particles and the second promoter particles exceeds 6 p.m. Therefore, the average particle diameter is preferably 6 μm or less. In addition, in Examples 4 and 11, the NOx conversion rate is decreased when the degree of dispersion is less than 40%. Thus, the degree of dispersion is preferably 40% or more.

Moreover, according to Examples 12 to 19, it is recognized that a high NOx conversion rate is achieved when the anchor material, the first and second promoter particles and the enclosure material contain the NOx adsorbing material.

The following is a specific explanation of a relationship between the NOx purification capacity and the distances between the respective centers of the catalyst units and the promoter units in the anchor/promoter simultaneous enclosure particles with reference to Reference examples 1 and 2 and Comparative examples 4 and 5.

Reference Example 1

First, a Zr—La composite oxide (anchor particles) having a specific surface area of approximately 70 m²/g was impregnated with a rhodium nitrate aqueous solution, followed by drying at 150° C. for 24 hours and baking at 400° C. for one hour, so as to obtain 1.0 wt % Rh-supporting anchor particles. Subsequently, the Rh-supporting anchor particles thus obtained were pulverized by a bead mill to obtain an average secondary particle diameter (D50) shown in Table 5. Simultaneously, a Zr—Ce composite oxide (first promoter particles) having a specific surface area of 80 m²/g was pulverized by a bead mill to obtain an average secondary particle diameter (D50) shown in Table 5.

Subsequently, boehmite as a precursor of the enclosure material, nitric acid and pure water were mixed and stirred for one hour. Then, the pulverized anchor particles and first promoter particles were slowly put into the stirred liquid, followed by stirring for another two hours by use of a high-speed stirring machine. Thereafter, the mixed liquid was rapidly dried, and further dried at 150° C. for 24 hours to remove moisture therefrom. The product thus obtained was further baked at 550° C. for three hours in air. Thus, anchor/promoter simultaneous enclosure particles of Reference example 1 were obtained.

225 g of the anchor/promoter simultaneous enclosure particles, 25 g of alumina sol, 230 g of water and 10 g of nitric acid were put into a magnetic ball mill and pulverized so as to obtain Rh catalyst slurry.

Subsequently, Pt-supporting $Al_2O_3$ powder and Ce—Zr—$O_x$ powder were preliminarily mixed separately from the Rh catalyst slurry to prepare catalyst powder. The catalyst powder was slurried in the same manner as the simultaneous enclosure particles to obtain Pt catalyst slurry. Then, the Pt catalyst slurry was applied to a cordierite honeycomb substrate (ø: 36 mm; the content: 0.12 L; 4 mil/600 cpsi), and redundant slurry inside the cells was removed by airflow, followed by drying at 130° C. and baking at 400° C. for one hour. Thus, a honeycomb substrate coated with 100 g/L of the Pt-supporting $Al_2O_3$ powder and the Ce—Zr—$O_x$ powder was manufactured.

Thereafter, the Rh catalyst slurry was applied to the honeycomb substrate coated with Pt, and redundant slurry inside the cells was removed by airflow, followed by drying at 130° C. and baking at 400° C. for one hour. Accordingly, a catalyst coated with 50 g/L of the catalyst layer containing the anchor/promoter simultaneous enclosure particles was obtained.

Reference Example 2

Reference example 2, a colloidal solution in which a primary particle diameter was 21 nm was used for the anchor particles (Zr—Ce composite oxide), a colloidal solution in which a primary particle diameter was 65 nm was used for the first promoter particles (Zr—Ce composite oxide), and Rh was supported only on the anchor particles. Then, a catalyst of this Reference example was obtained in the same manner as Reference example 1 except that the anchor particles and the first promoter particles were mixed with the boehmite slurry without the pulverization process of the anchor particles supporting Rh.

Comparative Example 4

Comparative example 4 is an example in which the anchor particles and the first promoter particles were covered with the enclosure material not concurrently but individually.

First, a Zr—La composite oxide (anchor particles) having a specific surface area of approximately 70 m²/g was impregnated with a rhodium nitrate solution, followed by drying at 150° C. for 24 hours and baking at 400° C. for one hour, so as to obtain 1.0 wt % Rh-supporting anchor particles. Subsequently, the Rh-supporting anchor particles thus obtained were pulverized by a bead mill to obtain an average secondary particle diameter (D50) shown in Table 5.

Subsequently, boehmite as a precursor of the enclosure material, nitric acid and pure water were mixed and stirred for one hour. Then, the pulverized Rh-supporting anchor particles were slowly put into the stirred liquid, followed by stirring for another two hours by use of a high-speed stirring machine. Thereafter, the mixed liquid was rapidly dried, and further dried at 150° C. for 24 hours to remove moisture therefrom. The product thus obtained was further baked at 550° C. for three hours in air. Thus, anchor particle enclosure powder was obtained.

Subsequently, the Zr—Ce composite oxide (first promoter particles) was pulverized to obtain an average secondary particle diameter (D50) shown in Table 5. Then, boehmite as a precursor of the enclosure material, nitric acid and pure water were mixed and stirred for one hour. The pulverized first promoter particles were slowly put into the stirred liquid, followed by stirring for another two hours by use of a high-speed stirring machine. Thereafter, the mixed liquid was rapidly dried, and further dried at 150° C. for 24 hours to remove moisture therefrom. The product thus obtained was further baked at 550° C. for three hours in air. Thus, first promoter particle enclosure powder was obtained.

125 g of the anchor particle enclosure powder, 100 g of the first promoter particle enclosure powder, 25 g of alumina sol, 230 g of water and 10 g of nitric acid were put into a magnetic ball mill and pulverized so as to obtain Rh catalyst slurry.

Subsequently, a honeycomb substrate coated with 100 g/L of the Pt-supporting $Al_2O_3$ powder and the Ce—Zr—$O_x$ powder was manufactured in the same manner as Reference example 1. Thereafter, the Rh catalyst slurry was applied to the honeycomb substrate coated with Pt, and redundant slurry inside the cells was removed by airflow, followed by drying at 130° C. and baking at 400° C. for one hour. Accordingly, a catalyst coated with 50 g/L of the catalyst layer containing the anchor/promoter enclosure powder was obtained.

Comparative Example 5

Comparative example 5 is an example in which the first promoter particles are not contained, and noble metal is supported on the anchor particles having an oxygen storage and release capacity.

First, a Zr—Ce composite oxide (anchor particles) having a specific surface area of approximately 70 m²/g was impregnated with a rhodium nitrate solution, followed by drying at 150° C. for 24 hours and baking at 400° C. for one hour, so as to obtain 1.0 wt % Rh-supporting anchor particles. Subsequently, the Rh-supporting anchor particles thus obtained were pulverized to obtain an average secondary particle diameter (D50) shown in Table 5.

Subsequently, boehmite as a precursor of the enclosure material, nitric acid and pure water were mixed and stirred for one hour. Then, the pulverized anchor particles were slowly put into the stirred liquid, followed by stirring for another two hours by use of a high-speed stirring machine. Thereafter, the mixed liquid was rapidly dried, and further dried at 150° C. for 24 hours to remove moisture therefrom. The product thus obtained was further baked at 550° C. for three hours in air. Thus, anchor particle enclosure powder of Comparative example 5 was obtained.

125 g of the anchor particle enclosure powder, 100 g of $Al_2O_3$, 25 g of alumina sol, 230 g of water and 10 g of nitric acid were put into a magnetic ball mill and pulverized so as to obtain Rh catalyst slurry.

Subsequently, a honeycomb substrate coated with 100 g/L of the Pt-supporting $Al_2O_3$ powder and the Ce—Zr—$O_x$ powder was manufactured in the same manner as Reference example 1. Thereafter, the Rh catalyst slurry was applied to the honeycomb substrate coated with Pt, and redundant slurry inside the cells was removed by airflow, followed by drying at 130° C. and baking at 400° C. for one hour. Accordingly, a catalyst coated with 50 g/L of the catalyst layer containing the anchor particle enclosure powder was obtained.

TABLE 5

| | Noble Metal | Anchor Particles Type (mol % in parentheses) | Anchor Particles Average Secondary Particle Diameter (nm) | First Promoter Particles Type (mol % in parentheses) | First Promoter Particles Average Secondary Particle Diameter (nm) | Average Distance between Catalyst Units and Promoter Units (nm) | (Anchor Particles + First Promoter): Enclosure Material (wt %) | Enclosure Material | NOx Residual Rate (%) |
|---|---|---|---|---|---|---|---|---|---|
| Reference Example 1 | Rh | Zr—La—O$_x$ | 350 | Zr—Ce(20)—O$_x$ | 250 | 290 | 70:30 | Al$_2$O$_3$ | 95 |
| Reference Example 2 | Rh | Zr—Ce—O$_x$ | 21 | Zr—Ce(20)—O$_x$ | 65 | 40 | 70:30 | Al$_2$O$_3$ | 98 |
| Comparative Example 4 | Rh | Zr—La—O$_x$ | 155 | Zr—Ce(20)—O$_x$ | 180 | 1430 | 70:30 | Al$_2$O$_3$ | 85 |
| Comparative Example 5 | Rh | Zr—Ce(30)—O$_x$ | 155 | — | — | <2 | 70:30 | Al$_2$O$_3$ | 83 |

[Evaluation 5]

The catalysts of Reference examples 1 and 2 and Comparative examples 4 and 5 were subjected to treatment for a durability test. Thereafter, the NOx conversion rate for each example was observed. With regard to the method of the treatment for the durability test, the catalysts of the respective examples were installed in an exhaust system of a 3500-cc gasoline engine, and then driven for 50 hours at the catalyst inlet temperature of 800° C. Unleaded gasoline was used for fuel. For the observation of the NOx conversion rate, the respective catalysts of the Reference examples and the Comparative examples after the durability test were installed in an exhaust system of a 3500-cc gasoline engine. Subsequently, the engine was driven in such a manner that the catalyst temperature was 400° C. Thus, the NOx conversion rate was obtained according to the NOx concentration at each inlet and outlet of the respective catalysts of the Reference examples and the Comparative examples based on the formula 3.

Figure 10:
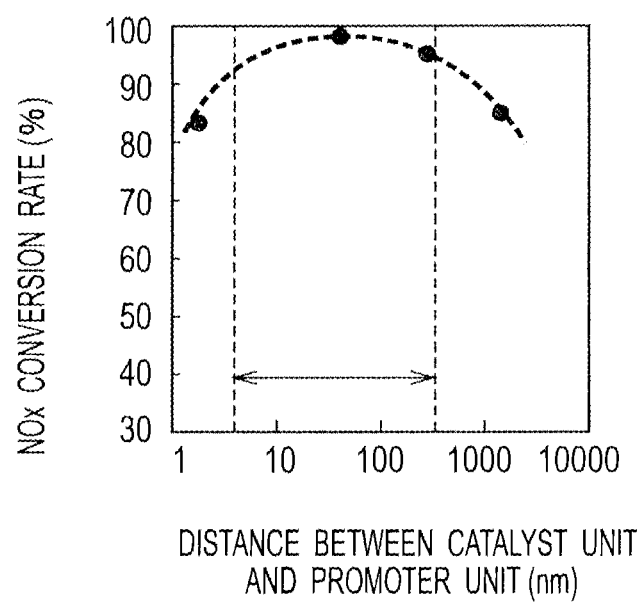
FIG. 10 is a graph showing a relationship between distances between respective centers of catalyst units and promoter units, and a NOx conversion rate.

The average distance between the respective centers of the catalyst units and the promoter units in Reference examples 1 and 2 and Comparative examples 4 and 5 was obtained in the same manner as the examples described above. FIG. 10 shows a relationship between the NOx conversion rate and the average distance between the centers of the respective units. According to FIG. 10, when the distances between the centers of these particles are between 5 nm and 300 nm, the NOx conversion rate is 90% or more. Thus, it is recognized that a high NOx purification performance can be achieved. In addition, according to FIG. 10 and Examples 1 to 19, it is recognized that quite high NOx purification performance can be achieved when the average distance between the respective centers of the catalyst units and the promoter units is between 150 nm and 250 nm.

The entire content of Japanese Patent Application No. P2009-261858 (filed on Nov. 17, 2009) is herein incorporated by reference.

Although the present invention has been described above by reference to the Examples. Comparative examples and Reference examples, the present invention is not limited to those, and it will be apparent to these skilled in the art that various modifications and improvements can be made within the scope of the present invention. For example, in the examples, although the catalyst layer has a two-layer structure of the Pt catalyst layer and the Rh catalyst layer, the catalyst layer may have a one-layer structure or three or more-layer structure. Further, the present invention can ensure a high NOx purification performance even when the undercoat layer 4 shown in FIG. 1(b) is not provided.

INDUSTRIAL APPLICABILITY

The exhaust gas purifying catalyst of the present invention includes the promoter particles having an oxygen storage and release capacity provided between the fine pores formed by the anchor/promoter simultaneous enclosure particles. Accordingly, excessive oxygen can be adsorbed even when an air-fuel ratio of exhaust gas varies, and high NOx purification performance can be achieved even inside the catalyst layer.

REFERENCE SIGNS LIST

1 Exhaust gas purifying catalyst
5 Anchor/promoter simultaneous enclosure particles
6 Second promoter particles
8 Noble metal particles
9 Anchor particles
11 First promoter particles
12 Enclosure material
13 Catalyst unit
14 Promoter unit
20 Exhaust gas purifying system

The invention claimed is:

1. An exhaust gas purifying catalyst, comprising:
anchor/promoter simultaneous enclosure particles comprising:
   catalyst units which contain: noble metal particles; and anchor particles as an anchor material of the noble metal particles supporting the noble metal particles;
   promoter units which are provided not in contact with the noble metal particles, and contain first promoter particles having an oxygen storage and release capacity; and
   an enclosure material which encloses both the catalyst units and the promoter units, and separates the noble metal particles and the anchor particles in the catalyst units from the first promoter particles in the promoter units; and
second promoter particles which have the oxygen storage and release capacity, and are not enclosed in the anchor/promoter simultaneous enclosure particles by the enclosure material.

2. The exhaust gas purifying catalyst according to claim 1, wherein the second promoter particles are being provided in fine pores formed between a plurality of the anchor/promoter simultaneous enclosure particles.

3. The exhaust gas purifying catalyst according to claim 1, wherein a weight ratio of the first promoter particles to a total weight of the first promoter particles and the second promoter particles is 0.3 or more.

4. The exhaust gas purifying catalyst according to claim 1, wherein an average distance between each center of the catalyst units and each center of the promoter units is between 5 nm and 300 nm.

5. The exhaust gas purifying catalyst according to claim 1, wherein the enclosure material includes the promoter units in sections partitioned by the enclosure material, and an average particle diameter Dc of the promoter units and an average fine pore diameter Db of fine pores formed in the enclosure material satisfy a condition of Db<Dc, so as to prevent a contact and aggregation of the first promoter particles of the promoter units enclosed in one section with the first promoter particles enclosed in another section beyond the one section.

6. The exhaust gas purifying catalyst according to claim 1, wherein an average particle diameter of the anchor/promoter simultaneous enclosure particles and the second promoter particles is 6 μm or less.

7. The exhaust gas purifying catalyst according to claim 1, wherein the noble metal particles contain rhodium, and the anchor particles contain zirconia.

8. The exhaust gas purifying catalyst according to claim 1, wherein the first promoter particles and the second promoter particles contain at least one of cerium (Ce) and praseodymium (Pr).

9. The exhaust gas purifying catalyst according to claim 1, wherein the enclosure material contains at least one of alumina and silica.

10. The exhaust gas purifying catalyst according to claim 1, wherein a degree of dispersion of the catalyst units and the promoter units in the anchor/promoter simultaneous enclosure particles is 40% or more.

11. The exhaust gas purifying catalyst according to claim 1, wherein the anchor material, the first promoter particles and the second promoter particles are an oxide containing at least one element selected from the group consisting of iron (Fe), manganese (Mn), cobalt (Co) and nickel (Ni).

12. The exhaust gas purifying catalyst according to claim 1, wherein the anchor material, the first promoter particles and the second promoter particles are an oxide containing at least one element selected from the group consisting of barium (Ba), magnesium (Mg), calcium (Ca), strontium (Sr) and sodium (Na).

13. The exhaust gas purifying catalyst according to claim 1, wherein the enclosure material is an oxide containing at least one element selected from the group consisting of cerium (Ce), zirconium (Zr), lanthanum (La), barium (Ba), magnesium (Mg), calcium (Ca), strontium (Sr) and sodium (Na).

14. The exhaust gas purifying catalyst according to claim 1, wherein a catalyst layer containing the anchor/promoter simultaneous enclosure particles and the second promoter particles is provided to coat a fire-resistant inorganic substrate.

15. The exhaust gas purifying catalyst according to claim 1, wherein an undercoat layer containing a fire-resistant inorganic oxide is provided under the catalyst layer as a lower-most layer.

16. A method for manufacturing the exhaust gas purifying catalyst according to claim 1, comprising:
- pulverizing composite particles of the noble metal particles and the anchor particles and the first promoter particles individually or concurrently;
- preparing the anchor/promoter simultaneous enclosure particles by mixing the pulverized composite particles and the pulverized first promoter particles with slurry containing a precursor of the enclosure material, followed by drying; and
- mixing the anchor/promoter simultaneous enclosure particles with the second promoter particles, followed by pulverizing.

17. An exhaust gas purifying system, comprising:
- an internal combustion engine;
- a three-way catalyst installed in an exhaust system of the internal combustion engine; and
- the exhaust gas purifying catalyst according to claim 1 provided downstream of the three-way catalyst.

* * * * *